US009496556B2

United States Patent
Naoi et al.

(10) Patent No.: US 9,496,556 B2
(45) Date of Patent: Nov. 15, 2016

(54) NEGATIVE ELECTRODE ACTIVE MATERIAL HAVING NANOSIZE TIN OXIDE PARTICLE DISPERDED ON SURFACE OF NANOSIZE CONDUCTIVE CARBON POWDER, METHOD FOR PRODUCING THE SAME, AND LITHIUM ION SECONDARY BATTERY USING THE SAME

(75) Inventors: Katsuhiko Naoi, Fuchu (JP); Yoshihiro Minato, Tokyo (JP); Shuichi Ishimoto, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 207 days.

(21) Appl. No.: 14/008,329

(22) PCT Filed: Mar. 30, 2012

(86) PCT No.: PCT/JP2012/058717
§ 371 (c)(1),
(2), (4) Date: Sep. 27, 2013

(87) PCT Pub. No.: WO2012/133844
PCT Pub. Date: Oct. 4, 2012

(65) Prior Publication Data
US 2014/0017570 A1 Jan. 16, 2014

(30) Foreign Application Priority Data

Mar. 30, 2011 (JP) ................................. 2011-076778
Mar. 30, 2011 (JP) ................................. 2011-076779
Mar. 30, 2011 (JP) ................................. 2011-076780
Oct. 4, 2011 (JP) ................................. 2011-220080

(51) Int. Cl.
*H01M 4/133* (2010.01)
*H01M 4/134* (2010.01)
(Continued)

(52) U.S. Cl.
CPC .............. *H01M 4/583* (2013.01); *B82Y 30/00* (2013.01); *H01G 11/32* (2013.01); *H01G 11/50* (2013.01);
(Continued)

(58) Field of Classification Search
CPC .... H01M 4/366; H01M 4/485; H01M 4/625; H01M 4/133; H01M 4/583; H01M 4/1391; H01G 11/32; H01G 11/50
USPC ........................................ 429/231.8; 252/506
See application file for complete search history.

(56) References Cited

U.S. PATENT DOCUMENTS

2008/0062616 A1* 3/2008 Matsuda ................ B82Y 30/00
361/516

(Continued)

FOREIGN PATENT DOCUMENTS

CN           101877406 A      11/2010
JP         2008270795 A   *  11/2008

(Continued)

OTHER PUBLICATIONS

Ishimoto et al., Machine translation of JP 2008-270795 A, Nov. 2008.*

(Continued)

*Primary Examiner* — Sean P Cullen
(74) *Attorney, Agent, or Firm* — Birch, Stewart, Kolasch & Birch, LLP

(57) ABSTRACT

Disclosed is a negative electrode active material which is capable of occluding and releasing lithium, and has high reversible capacity and reduced initial irreversible capacity. This negative electrode active material includes a granulated substance, in which a composite containing nanosize conductive carbon powder and tin oxide powder contacting the surface of the conductive carbon powder in a highly dispersed state and an aggregate selected from the group consisting of graphite and nongraphitizable carbon are aggregated. The electrochemical decomposition of electrolytic solution is suppressed due to a reduction in the area where the carbon material in the granulated substance and the electrolytic solution are in contact, resulting in a significant reduction in the initial irreversible capacity of the negative electrode active material.

4 Claims, 12 Drawing Sheets

(51) Int. Cl.
    *H01M 4/1393* (2010.01)
    *H01M 4/1395* (2010.01)
    *H01M 10/052* (2010.01)
    *H01M 4/583* (2010.01)
    *B82Y 30/00* (2011.01)
    *H01G 11/50* (2013.01)
    *H01M 4/36* (2006.01)
    *H01M 4/485* (2010.01)
    *H01M 4/62* (2006.01)
    *H01M 4/1391* (2010.01)
    *H01G 11/32* (2013.01)

(52) U.S. Cl.
    CPC ......... *H01M 4/133* (2013.01); *H01M 4/1391* (2013.01); *H01M 4/366* (2013.01); *H01M 4/485* (2013.01); *H01M 4/625* (2013.01); *H01M 10/052* (2013.01); *Y02E 60/122* (2013.01); *Y02E 60/13* (2013.01); *Y02P 70/54* (2015.11)

(56) References Cited

U.S. PATENT DOCUMENTS

| | | |
|---|---|---|
| 2010/0124704 A1 | 5/2010 | Suzuki |
| 2010/0173203 A1 | 7/2010 | Zhang et al. |
| 2010/0316907 A1 | 12/2010 | Yamamoto et al. |
| 2011/0300447 A1 * | 12/2011 | Archer .................. B82Y 30/00 429/231.8 |
| 2012/0132861 A1 * | 5/2012 | Tamamitsu ............ H01G 11/24 252/507 |
| 2012/0183860 A1 | 7/2012 | Naoi et al. |
| 2013/0040203 A1 * | 2/2013 | Yoon ...................... C01B 31/04 429/231.8 |

FOREIGN PATENT DOCUMENTS

| | | | |
|---|---|---|---|
| JP | 2010-123283 A | 6/2010 | |
| JP | 2010-161076 A | 7/2010 | |
| JP | 2010-212309 A | 9/2010 | |
| JP | WO 2010100954 A1 * | 9/2010 | ............ H01G 11/24 |
| JP | 2011-71063 A | 4/2011 | |
| JP | 2011-253620 A | 12/2011 | |

OTHER PUBLICATIONS

International Search Report for International Application No. PCT/JP2012/058717 dated Jul. 10, 2012.

Park et al., "Effects of low-temperature carbon encapsulation on the electrochemical performance of $SnO_2$ nanopowders", Carbon, vol. 46, 2008, pp. 35-40.

Yuan et al., "Nano-structured spherical porous $SnO_2$ anodes for lithium-ion batteries", Journal of Power Sources, vol. 159, 2006, pp. 345-348.

Chinese Office Action and Search Report, dated Jun. 30, 2015, for Chinese Application No. 201280016774.2.

\* cited by examiner (A)

(B)

NEGATIVE ELECTRODE ACTIVE MATERIAL HAVING NANOSIZE TIN OXIDE PARTICLE DISPERDED ON SURFACE OF NANOSIZE CONDUCTIVE CARBON POWDER, METHOD FOR PRODUCING THE SAME, AND LITHIUM ION SECONDARY BATTERY USING THE SAME

BACKGROUND OF THE INVENTION

1. Field of the Invention

The present invention relates to a negative electrode active material which can occlude and release lithium and which has a high reversible capacity and lowered initial irreversible capacity, and its manufacturing method. The present invention also relates to a lithium ion secondary battery using the negative electrode active material.

2. Description of the Related Art

As a power source of information devices such as a cell phone and a notebook-sized personal computer, a lithium ion secondary battery using a nonaqueous electrolytic solution with high energy density is widely used, but to deal with increased power consumption due to the higher performance of these information devices and the increased volume of content which these information devices handle, a higher discharge capacity of a lithium ion secondary battery is sought after. Moreover, in terms of the need to decrease oil consumption, alleviate atmospheric pollution and the emission abatement of carbon dioxide which causes global warming, expectations are growing in regard to low-emission vehicles such as electric vehicles and hybrid vehicles which can act as substitutes for gasoline-engine vehicles and diesel-engine vehicles, and as a battery for driving an engine in these low-emission vehicles, a large lithium ion secondary battery which has high energy density and output density, and therefore has high capacity density, is desired.

The currently prevailing lithium ion secondary battery using a nonaqueous electrolytic solution uses a lithium layered compound such as lithium cobalt oxide ($LiCoO_2$) as a positive electrode active material, graphite, which occludes and releases lithium as a negative electrode active material, and a solution in which a lithium salt such as lithium hexafluorophosphate ($LiPF_6$) is dissolved in a non-aqueous solvent including ethylene carbonate and propylene carbonate. To attain a higher capacity in these lithium ion secondary batteries, it is necessary to increase the quantity of lithium which is occluded in and released from a negative electrode active material. However, since the theoretical capacity of graphite calculated from $LiC_6$ in which the maximum amount of lithium is occluded is 372 $mAhg^{-1}$ and the existing secondary battery already has a quantity close to the theoretical capacity, the usage of a negative electrode active material as a substitute for graphite is indispensable to attain higher capacity in a lithium ion secondary battery. Moreover, the substitute must exhibit stable characteristics under a charge-discharge cycle.

As a graphite substitute with high capacity, a metal which forms an alloy with lithium, such as aluminum, zinc and tin are exemplary. Especially, Sn is suitable because its theoretical capacity calculated from $Li_{4.4}Sn$ is as high as 994 $mAhg^{-1}$. However, it has a problem in that volume expansion of Sn in accordance with occlusion of lithium is remarkably large. If the volume of Sn is 100%, the volume of $Li_{4.4}Sn$ is as much as 358%. Therefore, if the charge-discharge cycle is repeated in a battery in which Sn is used as a negative electrode active material, a crack is produced on the negative electrode due to too big a volume change in accordance with the occlusion and release of lithium, an electron conducting path which is indispensable for a charging and discharging reaction, is destroyed, and only several repetitions of charge-discharge cycle will sharply decrease the discharge capacity.

To solve this problem, a method to alleviate the stress due to the volume change of Sn by dispersing Sn in a matrix of carbon materials or oxides has been suggested. As a method to disperse Sn in the matrix of an oxide, there is a method to use tin dioxide as an active material (see Non-Patent Document 1 (Journal of Power Sources 159 (2006) 345-348 and Non-Patent Document 2 (CARBON 46 (2008) 35-40).

Tin dioxide occludes lithium by reaction as set out in the following chemical equations (I) and (II). The reaction in equation (I) in which reducing of tin dioxide and formation of lithium oxide occurs is referred to as a "conversion reaction" and the reaction in equation (II) in which an alloy of Sn and lithium is produced is referred to as an "alloying reaction". It is considered that lithium oxide produced from the conversion reaction acts as a matrix of Sn, which alleviates the stress due to the volume change of Sn in the alloying reaction region and inhibits aggregation of Sn in the alloying reaction region.

  (I)

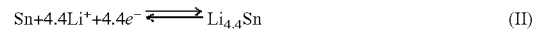  (II)

However, the conversion reaction set out in equation (I) was conventionally said to be an irreversible reaction because lithium oxide was thermodynamically stable. Therefore, in a lithium ion secondary battery in which tin dioxide was used as a negative electrode active material, only the alloying reaction region (within the range of 0 V to approximately 1 V against a $Li/Li^+$ electrode), which is a reversible reaction region, was used, and if charging/discharging was carried out by widening the potential range to an electric potential including the conversion reaction region, a great initial irreversible capacity due to the irreversibility of the conversion reaction was observed.

For this problem, the applicants suggested, in WO2011/040022 which was published after the filing date of an application regarded as a basis of the claim of priority in this application, a negative electrode active material in which the conversion reaction that was considered to be an irreversible reaction reversibly proceeds. The negative electrode active material shown in WO2011/040022 is a negative electrode active material, in which tin oxide powder and nanosize conductive carbon powder are comprised in a highly dispersed state. If the nanosize conductive carbon powder is used, the conversion reaction, which used to be regarded as an irreversible reaction and the cause of large initial irreversible capacity, proceeds reversibly, and therefore the conversion reaction region as well as the alloying reaction region can be used for the occlusion and releasing of lithium.

The reason why conversion reaction has now been observed to progress reversibly is not obvious at this moment, but it is considered to do for the following reasons. In the nanosize conductive carbon powder, oxygen atoms (oxygen in a surface functional group such as a carbonyl group and a hydroxyl group, or adsorbed oxygen) are contained abundantly, and therefore, a Sn—O—C bond through the intervention of this abundant oxygen becomes prone to be produced. Moreover, lithium oxide produced in the conversion reaction is considered to exist in a metastable state as illustrated in the following formula (III). It is considered that, as a condition in which lithium is easily removable from this lithium oxide in the metastable state is produced, formation of tin oxide simultaneously with removal of lithium is likely to occur, and the conversion reaction generates reversibly. Besides, if the nanosize conductive carbon powder and the tin oxide powder exist in a highly dispersed state, Sn—O—C bonds are formed in many sites because the points of contact of carbon powder and tin oxide powder increase, and therefore, the metastable state of the formula (III) is formed in many sites after the conversion reaction. As a result, a charge-discharge cycle within the range from 0 V to approximately 2 V against a Li/Li$^+$ electrode can be realized, and discharge capacity can be significantly increased.

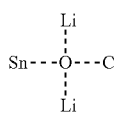
(III)

With this negative electrode active material comprising tin oxide powder and nanosize conductive carbon powder in a highly dispersed state, the conversion reaction region as well as the alloying reaction region can be used for occlusion and releasing of lithium, but as a result of further investigation, there is an initial irreversible capacity which seems to result from electrochemical decomposition of an electrolytic solution on the surface of carbon powder. This initial irreversible capacity is not preferable because it requires more positive electrode active material to be incorporated in a lithium ion secondary battery produced by combining this negative electrode active material with the positive electrode active material and, in a cell with a given volume, the quantity of the negative electrode active material is reduced all the more and the capacity per cell becomes small.

The applicants undertook repeated investigations, and in PCT/JP2012/054458, which was not published at the time of this application, suggested a negative electrode active material in which nanosize conductive carbon powder and tin oxide powder in contact with the surface of the conductive carbon powder are comprised in a highly dispersed state, and also a metal oxide other than tin oxide that contacts the surface of the conductive carbon powder, and/or, a low-conductive amorphous carbon layer that covers the surface of the conductive carbon powder were further comprised.

In the negative electrode active material disclosed in PCT/JP2012/054458, reversible progression of the conversion reaction is maintained. Moreover, probably because the active site on the surface of the conductive carbon powder that catalyzes the electrochemical decomposition of an electrolytic solution is coated by the metal oxide other than tin oxide and/or the low-conductive amorphous carbon layer and the electrochemical decomposition of an electrolytic solution is inhibited, initial irreversible capacity is reduced. The surface condition of the amorphous carbon layer that covers the surface of the conductive carbon powder is the same as the surface condition of the conductive carbon powder, but since the amorphous carbon layer has low conductivity, the electron necessary for the electrochemical decomposition of an electrolytic solution becomes difficult to be supplied to the surface of the amorphous carbon layer, and therefore, the electrochemical decomposition of an electrolytic solution on the surface of the amorphous carbon layer is inhibited. As a result, reduction of the initial irreversible capacity while maintaining the high reversible capacity of the negative electrode active material is possible.

PRIOR ARTS DOCUMENTS

Non-Patent Documents

Non-patent Document 1: Journal of Power Sources 159 (2006) 345-348
Non-patent Document 2: CARBON 46 (2008) 35-40

BRIEF SUMMARY OF THE INVENTION

1. Problems to be Solved by the Invention

The smaller an initial irreversible capacity of a negative electrode active material, the more efficiently the requirement of a positive electrode active material can be reduced to produce a lithium ion secondary battery by combining the negative electrode active material with the positive electrode active material, and in a cell with a given volume, the quantity of the negative electrode active material can be increased all the more and the capacity per cell can be efficiently increased. Moreover, the discharge capacity of the negative electrode active material is more preferable if it becomes larger.

Therefore, the objective of the present invention is to provide a negative electrode active material in which, on the basis of a negative electrode active material comprising tin oxide powder and nanosize conductive carbon powder in a highly dispersed state, high reversible capacity is maintained by keeping the reversible progression of the conversion reaction of tin oxide while initial irreversible capacity, which is considered to result from electrochemical decomposition of electrolytic solution on the surface of carbon powder, is reduced, and, its manufacturing method.

2. Means for Solving Problems

The inventors found, after keen examination on the basis of a composite of tin oxide powder and nanosize conductive carbon powder (a negative electrode active material of WO2011/040022), that, by using graphite and/or nongraphitizable carbon as an aggregate and by forming a granulated substance in which the composite and the aggregate are densely aggregated, reversible progression of the conversion reaction is maintained and a negative electrode active material with remarkably reduced initial irreversible capacity is obtained.

Therefore, the present invention, in the first place, relates the first negative electrode active material capable of occluding and releasing lithium, comprising a granulated substance, in which a composite comprising nanosize conductive carbon powder and tin oxide powder contacting the surface of the conductive carbon powder in a highly dispersed state, and an aggregate selected from the group consisting of graphite and nongraphitizable carbon are aggregated.

In this description, the "powder" is composed of a particulate material with an unrestricted shape; it is not restricted to a powder consisting of spherical particles but can be a powder that is needle-shaped, tubular or strap-shaped particulate material. Also, the "nanosize" means that the average particle diameter is 1 to 500 nm, preferably 1 to 50 nm if the powder consists of spherical particles, and that the average distance across is 1 to 500 nm, preferably 1 to 50 nm if the powder consists of needle-shaped, tubular or strap-shaped particulate material. Also, the "highly dispersed state" means that generally 30% by mass or more, preferably 85% by mass or more, more preferably 95% by mass or more, and especially 98% by mass or more of the primary particles of the conductive carbon powder and the tin oxide powder are not aggregated. The non-aggregation rate of the powder is a value calculated from the result of the powder condition observed with transmission electron microscope (TEM) photographs. Graphite and nongraphitizable carbon used as the aggregate have grains with a size larger than the grains in the composite, and have an average particle diameter of generally 1 to 300 μm, preferably 2 to 50 μm, and especially preferably 5 to 30 μm. The average particle diameter of the aggregate is a value measured by a laser diffraction scattering method.

When a lithium ion secondary battery is constituted with the first negative electrode active material, electrochemical decomposition of an electrolytic solution occurs on the outer surface of the granulated substance, and SEI is formed on the outer surface of the granulated substance. The solvent of the electrolytic solution cannot pass through this SEI of the outer surface of the granulated substance, but lithium in the electrolytic solution can go through the SEI. On the other hand, in the composite of the granulated substance, a Sn—O—C bond is likely to be produced by the nanosize conductive carbon powder and the tin oxide powder which exist in a highly dispersed state, and therefore, a metastable state shown in the formula (III) is formed in many sites after the conversion reaction. Therefore, by a reaction between lithium, which can go through the SEI, and a composite, reversible progression of the conversion reaction is maintained, and a charge-discharge cycle in the range of 0 V to 2 V against a Li/Li$^+$ electrode can be realized. Further, since the contact area of the electrolytic solution and the carbon material can be decreased by the SEI, which is formed on the outer surface of the granulated substance, initial irreversible capacity, which is considered to result from the electrochemical decomposition of the electrolytic solution on the surface of the carbon material, can be reduced remarkably. Moreover, the reversible capacity of graphite and nongraphitizable carbon used as the aggregate is smaller than the reversible capacity of the composite, but because the bulk density of the granulated substance obtained by pulverization remarkably increases compared with the bulk density of the composite alone, reduction of the reversible capacity per unit volume when the granulated substance is used as a negative electrode active material is inhibited, or rather, the reversible capacity is increased.

In the first negative electrode active material, it is preferable that the tin oxide powder contained in the composite in the granulated substance is also nanosize. It is more preferable that the tin oxide powder has nanosize spherical particles, and it is especially preferable that it has spherical particles with an average particle diameter of 1 to 10 nm. This is because the Sn—O—C bond is more likely to be produced and the metastable condition is more likely to be achieved if such a fine spherical particle of tin oxide, which has a large surface area, contacts the surface of the conductive carbon powder.

As for structural change, including volume expansion or aggregation, where the composite of tin oxide and carbon is used as a negative electrode active material, consideration was given only to the alloying reaction region while no consideration was given to the conversion reaction region. This is because the conversion reaction was regarded as an irreversible reaction, and only the alloying reaction region, which is a reversible reaction region, was used. However, using a composite in which nanosize conductive carbon powder and tin oxide powder is comprised in a highly dispersed state as a negative electrode active material, a charge-discharge cycle test in the potential range containing the conversion reaction region became possible, and consideration of the conversion reaction region became possible. As a result, it was found that when the composite of tin oxide and carbon is used as a negative electrode active material, inhibition of aggregation of the composite occurred in the conversion reaction region as well as inhibition of stress by volume change in the alloying reaction region is important to obtain a negative electrode active material with excellent cyclic characteristics within the potential range containing the conversion reaction region (see WO2011/040022, which is published after the filing date of an application regarded as a basis of the claim of priority in this application).

To inhibit this aggregation of the composite, usage of nanosize conductive carbon powder with a large surface area is effective, and it is important that this carbon powder and tin oxide powder exist in a highly dispersed state, but it is preferable that in the first negative electrode active material, the conductive carbon powder contained in the composite in the granulated substance has an inner vacancy, and that the tin oxide powder substantively exists in the inner vacancy. This is because it has been found that aggregation of the composite is especially induced by tin oxide powder supported on the surface of carbon powder. The "inner vacancy" includes a hollow of KETJEN BLACK, an internal or interstitial pore of a carbon nanofiber or a carbon nanotube as well as a pore of porous carbon powder. Also, the term "tin oxide powder substantively exists in an inner vacancy" means that 95% by mass or more, preferably 98% by mass or more, and especially preferably 99% by mass or more of the total tin oxide exists in the inner vacancy.

Especially, it is preferable to use KETJEN BLACK, which has a hollow-shell structure and an open pore to connect the inner surface and the outer surface of a shell, as the conductive carbon powder contained in the composite of the granulated substance. Since KETJEN BLACK has a large surface area and has a lot of oxygen (oxygen of a surface functional group and adsorbed oxygen) on the inner and outer surface and the edge surface, the Sn—O—C bond and the metastable state are abundantly formed. Also, the nanosize tin oxide powder, preferably spherical tin oxide particles with an average particle diameter of 1 to 10 nm, and more preferably spherical tin oxide particles with an average particle diameter of 1 to 2 nm can be preferentially supported in the hollow of KETJEN BLACK, aggregation of the composite occurred in the conversion reaction region is inhibited, and volume expansion of tin in the alloying reaction region is effectively inhibited by the shell. As a result, a negative electrode active material with excellent cycling characteristics in the potential range containing the conversion reaction region is obtained.

On the other hand, to increase the discharge capacity of the negative electrode active material, it is preferable to increase the quantity of tin oxide with a large theoretical capacity. However, because the quantity of tin oxide that can be contained in the inner vacancy of the conductive carbon powder is limited, if tin oxide beyond the capacity is supported on the outer surface of the conductive carbon powder, there is a concern that this tin oxide will cause aggregation of the composite. To prevent this, it is preferable that the composite in the granulated substance further comprises a low-conductive amorphous carbon film covering an area which is included in the surface of the nanosize tin oxide spherical particle and which does not contact the surface of the conductive carbon powder. The "low-conductive amorphous carbon film" means an amorphous carbon film with $1/100$ or less, preferably $1/1,000$ or less, and especially preferably $1/10,000$ or less of the electric conductivity of the conductive carbon powder contained in the composite. In this form, since the amount of tin oxide contained in the composite can be increased and a Sn—O—C bond can also be produced between the spherical particle of tin oxide and the low-conductive amorphous carbon film, a negative electrode active material with increased discharged capacity is obtained. Besides, though a tin oxide particle is supported on the surface of the conductive carbon powder, since the aggregation of the composite is inhibited by the low-conductive amorphous carbon film covering the tin oxide particle, a negative electrode active material with excellent cycling characteristics in the potential range including the conversion reaction region is obtained. Moreover, since the amorphous carbon film covering the surface of the spherical particle of tin oxide acts as a binder layer to the aggregate in forming the granulated substance, a dense granulated substance is obtained, and invasion of the electrolytic solution into the inside of the granulated substance is effectively inhibited. Moreover, since the amorphous carbon film has low conductivity, an electron necessary for the electrochemical decomposition of the electrolytic solution becomes difficult to be supplied to the surface of the amorphous carbon film, and the electrochemical decomposition of the electrolytic solution on the surface of the amorphous carbon film is inhibited. As a result, a negative electrode active material with reduced initial irreversible capacity is obtained.

It is preferable that the composite in the granulated substance further comprises a low-conductive amorphous carbon layer that covers the surface of the conductive carbon powder. Here, the "low-conductive amorphous carbon layer" means an amorphous carbon layer that has $1/100$ or less, preferably $1/1,000$ or less, and especially preferably $1/10,000$ or less of the electric conductivity of the conductive carbon powder contained in the composite. Since this amorphous carbon layer acts as a binder layer to the aggregate in forming the granulated substance, a dense granulated substance is obtained, and invasion into the inside of the granulated substance of the electrolytic solution is effectively inhibited. Also, as the amorphous carbon layer has low conductivity, an electron necessary for the electrochemical decomposition of the electrolytic solution becomes difficult to be supplied to the surface of the amorphous carbon layer, and the electrochemical decomposition of the electrolytic solution on the surface of the amorphous carbon layer is inhibited. As a result, a negative electrode active material with remarkably reduced initial irreversible capacity is obtained.

It is preferable that the composite in the granulated substance further comprises a metal oxide other than tin oxide which covers the surface of the conductive carbon powder. In the range of the "metal oxide", oxides of typical metal, transition metal and metalloid are included, but tin oxide is excluded. Since the active site of the surface of the conductive carbon powder that catalyzes the electrochemical decomposition of the electrolytic solution is coated by the metal oxide and the electrochemical decomposition of the electrolytic solution is inhibited, the initial irreversible capacity resulting from the composite that is exposed on the outer surface of the granulated substance is lowered.

In the granulated substance in the first negative electrode active material, at least one of graphite and nongraphitizable carbon is comprised as the aggregate, but graphite is more excellent as the aggregate compared with nongraphitizable carbon because the former has large reversible capacity and large bulk density.

The first negative electrode active material can be manufactured by a method comprising: a mixing step of obtaining a mixture of a composite comprising nanosize conductive carbon powder and tin oxide powder contacting the surface of the conductive carbon powder in a highly dispersed state, and an aggregate selected from the group consisting of graphite and nongraphitizable carbon; and a granulation step of pulverizing the mixture to obtain a granulated substance by agglomeration of the composite and the aggregate. Therefore, the present invention also relates to the manufacturing method of the first negative electrode active material, which comprises the mixing step and the granulation step.

By mixing the composite in which nanosize conductive carbon powder and tin dioxide powder that contacts the surface of the conductive carbon powder are contained in highly dispersed state, and the aggregate selected from a group consisting of graphite and nongraphitizable carbon, and then pulverizing the mixture obtained, a coarse grain of the aggregate is aggregated while capturing fine grains produced by pulverization and the composite, and as a result, a granulated substance, in which the aggregate and the composite are densely aggregated, is formed.

If pulverization in the granulation step is carried out by jet milling, because pulverization efficiency is high with this method, a dense granulated substance with stable structure having fine aggregate is efficiently obtained and, as a result, the initial irreversible capacity of the first negative electrode active material is remarkably reduced and charge-discharge cycle characteristics are improved.

Of the composites which are contained in the granulated substance of the first negative electrode active material and in which nanosize conductive carbon powder and tin oxide powder contacting the surface of the conductive carbon powder are contained in a highly dispersed state, a composite, in which the tin oxide powder is composed of a nanosize tin oxide spherical particle and which further comprises a low-conductive amorphous carbon film covering the area that is included in the surface of the nanosize tin oxide spherical particle and does not contact the conductive carbon powder, is itself suitable as a negative electrode active material. Therefore, the present invention also relates to a second negative electrode active material capable of occluding and releasing lithium, in which nanosize conductive carbon powder and a nanosize tin oxide spherical particle contacting the surface of the conductive carbon powder are comprised in a highly dispersed state, and a low-conductive amorphous carbon film covering an area which is included in the surface of the tin oxide spherical particle and which does not contact the surface of the conductive carbon powder is further comprised.

In the second negative electrode active material, a Sn—O—C bond is likely to be produced by the nanosize conductive carbon powder and the nanosize tin oxide spherical particle in a highly dispersed state, and a Sn—O—C bond is also likely to be produced between the tin oxide particle and the low-conductive amorphous carbon film, and therefore, a metastable state as shown in equation (III) is formed in many sites after the conversion reaction. As a result, the reversible progress of the conversion reaction is maintained and a charge-discharge cycle within the area of 0 V to approximately 2 V against a Li/Li$^+$ electrode can be realized. Also, in the repetition of charging/discharging within the potential range containing the conversion reaction region, even if a tin oxide particle exists on the surface of the carbon powder, since aggregation of the negative electrode active material induced by the tin oxide particle is inhibited by the amorphous carbon film, the quantity of tin oxide particles can be increased. As a result, the discharge capacity per unit volume of the negative electrode active material can be increased and good charge-discharge cycle characteristics can be obtained. Further, by increasing the quantity of tin oxide particles, the active site on the surface of conductive carbon powder that catalyzes the electrochemical decomposition of the electrolytic solution can be covered with more tin oxide particles and the initial irreversible capacity that results from the electrochemical decomposition of the electrolytic solution on the surface of the conductive carbon powder can be decreased. Further, since the amorphous carbon film has low conductivity, an electron necessary for the electrochemical decomposition of the electrolytic solution becomes difficult to be supplied to the surface of the amorphous carbon film, and therefore, the electrochemical decomposition of the electrolytic solution on the surface of the amorphous carbon film is inhibited. As a result, a negative electrode active material with reduced initial irreversible capacity is obtained.

This suitable second negative electrode active material can be suitably produced in a method to perform a sol-gel process and dispersion in an ultracentrifuge field at the same time, that is, in a method in which a reaction solution comprising a tin oxide precursor and nanosize conductive carbon powder is introduced in a rotatable reactor, a sol-gel reaction of the tin oxide precursor is made by turning the reactor and at the same time the conductive carbon powder is made to support the reaction product of the sol-gel reaction in a highly dispersed state, by making polyvinyl alcohol coexist in the reaction solution. The "tin oxide precursor" means a compound which changes into tin oxide during the manufacturing process of a negative electrode active material. Also, the term "polyvinyl alcohol" is not a term that refers in a limited way to polyvinyl alcohol in which the saponification degree of the polyvinyl acetate is 100%, but refers to polyvinyl alcohol in which the saponification degree of polyvinyl acetate is 80% or more.

Therefore, the present invention relates to a manufacturing method of the second negative electrode active material that comprises three steps, namely, an introduction step of introducing, into a rotatable reactor, a reaction solution prepared by adding nanosize conductive carbon powder to a solution in which a tin oxide precursor and polyvinyl alcohol are dissolved; a reaction step of rotating the reactor so as to obtain a nanosize reaction product with a spherical shape by inducing a hydrolysis reaction and a polycondensation reaction of the tin oxide precursor while adding shearing stress and centrifugal force on the reaction solution, and simultaneously support the reaction product on the conductive carbon powder and also attach polyvinyl alcohol to the surface of the reaction product; and a heat treatment step of drying a product obtained by the reaction step and pyrolyzing polyvinyl alcohol to form a low-conductive amorphous carbon film on the surface of a nanosize tin oxide spherical particle.

Probably because, in the reaction step, the mechanical energies of both shearing stress and centrifugal force are simultaneously added to the reaction solution and this mechanical energy is changed into chemical energy, a hydrolysis reaction and a polycondensation reaction of the tin oxide precursor can be performed at a nonconventional speed, and a nanosize spherical-shaped reaction product can be obtained, and at the same time, the reaction product can be made to be supported by the conductive carbon powder in a highly dispersed state. At the same time, by strong mutual interaction between the tin oxide precursor and/or the reaction product and a hydroxyl group in polyvinyl alcohol and/or an oxygen ion formed by dissociation of hydroxyl group in polyvinyl alcohol, polyvinyl alcohol can be made to be attached to the surface of the reaction product. Moreover, the particle diameter of the reaction product is miniaturized compared with the particle diameter of a reaction product obtained from a reaction solution in which polyvinyl alcohol is not used. Then, in the heat treatment step, if the product obtained in the reaction step is dried, and polyvinyl alcohol is pyrolyzed (incomplete combustion) under a non-oxidizing atmosphere, a low-conductive amorphous carbon film derived from polyvinyl alcohol can be formed on the surface of a nanosize spherical particle of tin oxide, preferably a spherical particle with an average particle diameter of 1 to 10 nm, and especially preferably a spherical particle with an average particle diameter of 1 to 2 nm, It is preferable that the conductive carbon powder used in the reaction step is KETJEN BLACK. If KETJEN BLACK is used as the conductive carbon powder, the mass of the tin oxide precursor in the reaction solution can be within 1.5 to 4 times as much as the mass of KETJEN BLACK in terms of tin dioxide, and a negative electrode active material with high discharge capacity can be obtained. Especially, a negative electrode active material in which a spherical particle of tin oxide with preferably an average particle diameter of 1 to 10 nm, and especially preferably an average particle diameter of 1 to 2 nm, contacts the outer surface and inner surface of KETJEN BLACK has a remarkably high discharge capacity per unit volume and excellent cycling characteristics. The term "in terms of tin dioxide" means that the mass is calculated on the assumption that all the tin contained in the tin oxide precursor is changed into tin dioxide.

Of the composites which are contained in the granulated substance of the first negative electrode active material and in which nanosize conductive carbon powder and tin dioxide powder which contacts the surface of the conductive carbon powder are contained in a highly dispersed state, a composite which further comprises a low-conductive amorphous carbon layer covering the surface of conductive carbon powder is itself suitable as a negative electrode active material. In this third negative electrode active material, a Sn—O—C bond is likely to be produced by the nanosize conductive carbon powder and the tin oxide powder in a highly dispersed state, and therefore, a metastable state described in equation (III) is formed in many sites after the conversion reaction. As a result, the reversible progress of the conversion reaction is maintained and the charge-discharge cycle within the range of 0 V to approximately 2 V against a $Li/Li^+$ electrode can be realized. Moreover, since the amorphous carbon layer has low conductivity, an electron necessary for the electrochemical decomposition of the electrolytic solution becomes difficult to be supplied to the surface of the amorphous carbon layer, and therefore, the electrochemical decomposition of the electrolytic solution on the surface of the amorphous carbon layer is inhibited. As a result, a negative electrode active material with reduced initial irreversible capacity is obtained.

The third negative electrode active material capable of occluding and releasing lithium in which nanosize conductive carbon powder and tin oxide powder contacting the surface of the conductive carbon powder are comprised in a highly dispersed state, and a low-conductive amorphous carbon layer covering the surface of the conductive carbon powder is further comprised, can be suitably produced by a method which comprises: a kneading step of obtaining a kneaded material of a composite comprising nanosize conductive carbon powder and tin oxide powder contacting the surface of the conductive carbon powder in a highly dispersed state, and an amino acid of the formula (A)

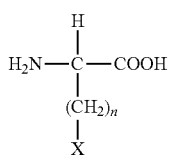

(A)

where n is an integer 1 to 4, and X is hydroxy group, amino group or carboxyl group; and a heat treatment step of heat-treating the kneaded material to form a low-conductive amorphous carbon layer by pyrolytic decomposition of the amino acid of the formula (A). By using the amino acid represented by formula (A), the initial irreversible capacity resulting from the conductive carbon powder is effectively decreased.

By kneading the composite and the amino acid represented by formula (A), a layer of the amino acid is formed at least in the area which is included in the surface of the conductive carbon powder and which does not contact the tin oxide powder. If heat treatment is further given to the kneaded material and the amino acid is pyrolyzed and changed into amorphous carbon, a low-conductive amorphous carbon layer is formed at least in the area which is included in the surface of the conductive carbon powder and which does not contact the tin oxide powder. It is preferable that the heat treatment step is carried out at a temperature within the range of 450 to 500 degrees centigrade in a non-oxidizing atmosphere.

If glycine, valine and 5-methylglutamate are used in place of the amino acid represented by formula (A), initial irreversibly capacity is not effectively reduced. The reason why the initial irreversible capacity derived from the conductive carbon powder is effectively decreased by using the amino acid represented by formula (A) is not evident at present, but it is considered to occur as follows. When these compounds are heat-treated in a non-oxidizing atmosphere in the heat treatment step, in the course of the temperature rising, either one of an amino group or a carboxy group combined with an asymmetric carbon atom and the group X are reacted and a cyclic compound is formed, but it is difficult to pyrolyze this cyclic compound and it is therefore slowly pyrolyzed on the conductive carbon powder. Therefore, after heat treatment, a dense, low-conductive amorphous carbon layer is formed on the surface of the conductive carbon powder. It is considered that the arrival of the electrolytic solution at the surface of the conductive carbon powder is effectively inhibited by the dense, low-conductive amorphous carbon layer and that the initial irreversible capacity is effectively decreased.

The negative electrode active material of the present invention is suitable for a lithium ion secondary battery because it has high reversible capacity and reduced initial irreversible capacity. Therefore, the present invention further provides a lithium ion secondary battery having a negative electrode comprising the negative electrode active material of the present invention, a positive electrode comprising a positive electrode active material that can occlude and release lithium, and a separator retaining a nonaqueous electrolytic solution which is placed between the negative electrode and the positive electrode. Moreover, the negative electrode active material of the present invention can be suitably used to constitute a hybrid capacitor in combination with a positive electrode active material such as activated carbon.

3. Advantageous Effects of the Invention

The first negative electrode active material of the present invention comprising a granulated substance in which a composite comprising nanosize conductive carbon powder and tin dioxide powder contacting the surface of the conductive carbon powder in a highly dispersed state, and an aggregate selected from the group consisting of graphite and nongraphitizable carbon are aggregated, has an improved discharge capacity per unit volume because reversible progress of the conversion reaction is maintained and the bulk density of the negative electrode active material can be improved. Also, the first negative electrode active material has a remarkably reduced initial irreversible capacity because the electrochemical decomposition of the electrolytic solution is inhibited by a decrease in the contact area between the carbon material in the granulated substance and the electrolytic solution.

The composite which is suitably used in the manufacture of the first negative electrode active material and in which nanosize conductive carbon powder and a nanosize spherical particle of tin oxide that contacts the surface of the conductive carbon powder are comprised in a highly dispersed state and a low-conductive amorphous carbon film covering the area which is included in the surface of the tin oxide spherical particle and which does not contact the surface of the conductive carbon powder is further comprised, is itself suitable as a negative electrode active material. This second negative electrode active material has an improved discharge capacity per unit volume because reversible progress of the conversion reaction is maintained and the amount of tin oxide particles can be increased. Since the surface of the conductive carbon powder is covered by tin oxide particles in an increased amount and the electrochemical decomposition of the electrolytic solution is inhibited, the second negative electrode active material has reduced initial irreversible capacity. Also, the second negative electrode active material shows excellent charge-discharge cycle characteristics because aggregation of the negative electrode active material is inhibited by the low-conductive amorphous carbon film. The amorphous carbon film covering the area that is included in the surface of the spherical particle of tin oxide and that does not contact the surface of the conductive carbon powder can be formed by pyrolysis of polyvinyl alcohol.

The composite which is suitably used in manufacture of the first negative electrode active material and in which nanosize conductive carbon powder and tin oxide powder that contacts the surface of the conductive carbon powder are comprised in a highly dispersed state and a low-conductive amorphous carbon layer covering the surface of the conductive carbon powder is further comprised, is itself preferable as a negative electrode active material. This third negative electrode active material has a high discharge capacity because reversible progress of the conversion reaction is maintained and it has a reduced initial irreversible capacity because the electrochemical decomposition of the electrolytic solution on the surface of the conductive carbon powder is inhibited. The low-conductive amorphous carbon layer covering the surface of the conductive carbon powder can be densely formed by pyrolysis of the amino acid represented in Formula (A).

Therefore, the negative electrode active material of the present invention is remarkably promising as a substitute for graphite as a negative electrode active material in a lithium ion secondary battery and a hybrid capacitor.

DETAILED DESCRIPTION OF THE INVENTION

Figure 1:
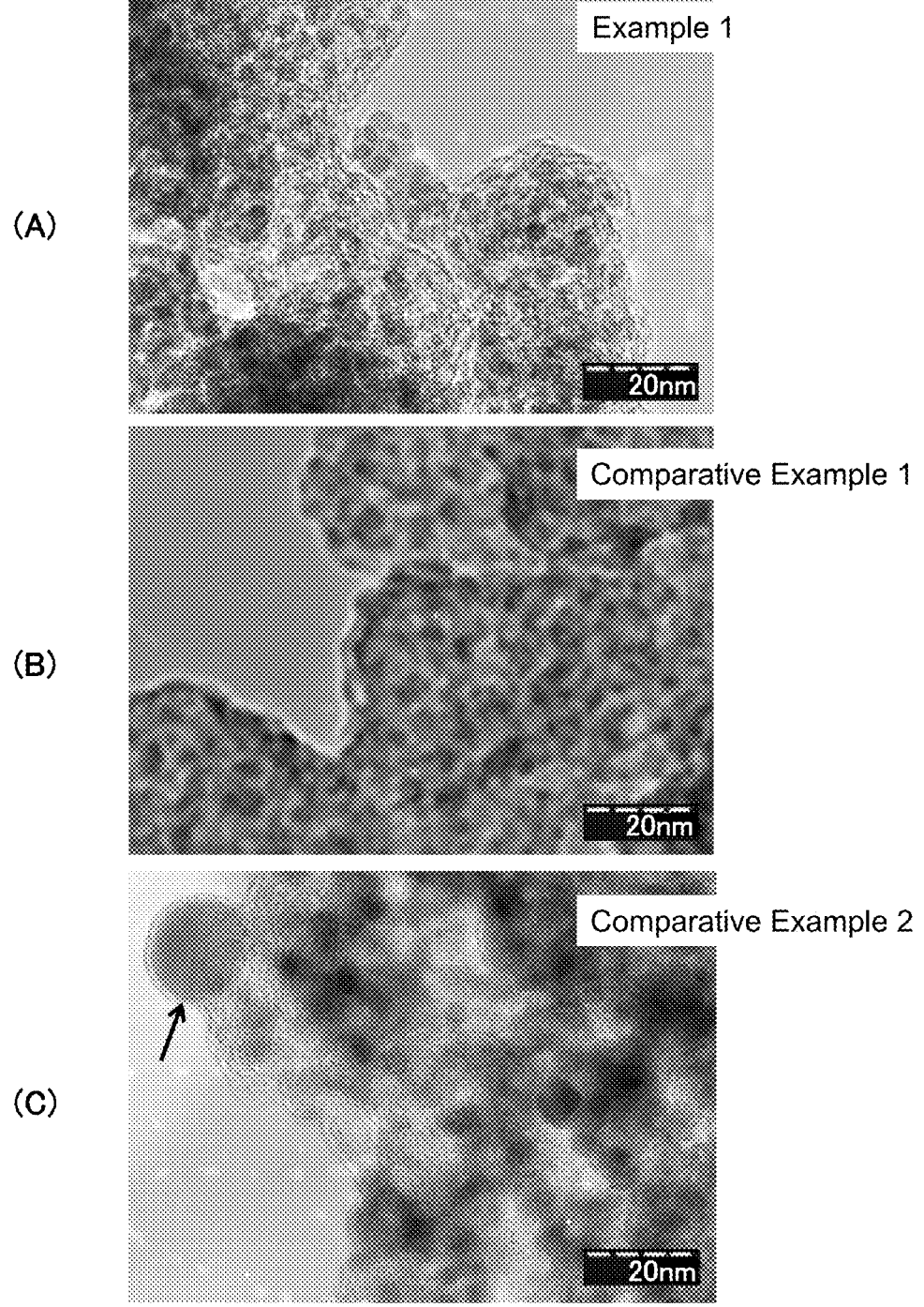
FIG. 1 shows a TEM photograph of a negative electrode active material with an amorphous carbon film covering the surface of the tin oxide particle; (A) is a photograph of a negative electrode active material of a working example, and (B) and (C) are photographs of a negative electrode active material in comparative examples.

First of all, an explanation is given for a composite in which nanosize conductive carbon powder and tin oxide powder that contacts the surface of the conductive carbon powder are comprised in highly dispersed state, and then an explanation of a granulated substance comprising the composite (first negative electrode active material) is given.

(1) Composite

The tin oxide powder contained in the composite can be tin dioxide, or a mixture of tin dioxide and tin oxide. The tin oxide powder does not need to be nanosize, but if the tin oxide powder is nanosize, it is preferable because the surface area of tin oxide is increased and the point of contact with the nanosize carbon powder is increased, so that a Sn—O—C bond is formed in many sites, and therefore a metastable state shown in formula (III) is likely to be formed after the conversion reaction. Moreover, if the tin oxide powder is fine, since fine tin is dispersed in a lithium-oxide matrix after the conversion reaction, massive volume change in accordance with the occlusion and releasing of lithium in a reversible alloying reaction is effectively inhibited by this matrix. Also, if the tin oxide powder is fine, the number of reaction sites of the tin oxide powder is increased and the diffusion length of lithium within the tin oxide powder is shortened.

As the nanosize tin oxide powder, a nanowire and a nanotube as well as a nanosize spherical particle can be used, but it is preferable to use a spherical particle with an average particle diameter of 1 to 10 nm and especially a spherical particle with an average particle diameter of 1 to 2 nm. By the nanosize conductive carbon powder, preferably a spherical carbon particle, and the nanosize tin oxide powder which contacts its surface, preferably a spherical tin oxide particle with an average particle diameter of 1 to 10 nm and especially a spherical tin oxide particle with an average particle diameter of 1 to 2 nm, a composite which has high reversible capacity, reduced initial irreversible capacity, and moreover, which shows small reduction in discharge capacity in a charge-discharge cycle test within the range of 0 V to approximately 2 V against a Li/Li$^+$ electrode and has remarkably excellent cycling characteristics is obtained.

As the nanosize conductive carbon powder contained in the composite, nanosize carbon black such as KETJEN BLACK, acetylene black or channel black, fullerene, carbon nanotube, carbon nanofiber, amorphous carbon, carbon fiber, natural graphite, artificial graphite, graphitized KETJEN BLACK, activated carbon and mesoporous carbon are exemplary. Also, a vapor-grown carbon fiber can be used. These carbon powders can be used separately, or more than one type can be mixed together and used.

Since it is considered that the conversion reaction reversibly progresses because a Sn—O—C bond is formed through oxygen in the conductive carbon powder, it is preferable that oxygen atoms are abundantly contained in the nanosize conductive carbon powder used. Therefore, carbon powder with a large surface area is preferable, and it is especially preferable that the surface area per gram of carbon powder is 1000 m$^2$ or more. Further, minute carbon powder is preferable, and it is especially preferable that carbon powder with a spherical particle with an average particle diameter of 10 to 50 nm is used. Also, in terms of the amount of oxygen in the carbon powder, it is preferable that an amount of oxygen per gram of carbon powder is 5.0 mmol or more. The "amount of oxygen per gram of carbon powder" means the amount of oxygen which is calculated based on TG measurement of carbon powder to be used for the negative electrode active material in a nitrogen atmosphere at the temperature raising rate of 1 degree centigrade/minute within the range of 30 to 1000 degrees centigrade, and based on the assumption that the total amount of weight loss within the range of 150 to 1000 degrees centigrade was in the form of desorption as $CO_2$. For example, if the weight loss of 1 g of carbon powder within the range of 150 to 1000 degrees centigrade is 22 mg, the amount of oxygen per gram of carbon powder is calculated as 1 mmol. For this carbon powder, nanosize carbon black, preferably KETJEN BLACK is exemplary.

To obtain a negative electrode active material with excellent cycling characteristics within the potential range containing the conversion reaction region, it has been found to be important not only to inhibit the stress caused by volume change in the alloying reaction region, but also to inhibit aggregation of the negative electrode active material occurred in the conversion reaction region. To inhibit this aggregation, it is effective to use nanosize carbon powder with a large surface area in the composite of tin oxide powder and conductive carbon powder, and it is important that the carbon powder and the tin oxide powder exist in a highly dispersed state. Especially, it is preferable that the conductive carbon powder has an inner vacancy such as KETJEN BLACK, carbon nanotube, carbon nanofiber and porous carbon, and the tin oxide powder substantially exists in the inner vacancy. This is because it has been found that aggregation of the negative electrode active material is especially induced by tin oxide powder supported on the surface of carbon powder.

Therefore, it is preferable to use KETJEN BLACK with a hollow-shell structure as the conductive carbon powder. Since KETJEN BLACK has a large surface area and has a lot of oxygen on the inner and outer surface and on the edge surface (oxygen of a surface functional group, adsorbed oxygen), a Sn—O—C bond is formed abundantly, and therefore, a metastable state shown in formula (III) is abundantly formed. Moreover, the nanosize tin oxide powder, preferably a spherical tin oxide particle with an average particle diameter of 1 to 10 nm, and particularly a spherical tin oxide particle with an average particle diameter of 1 to 2 nm can be preferentially supported in the hollow of KETJEN BLACK, aggregation of the negative electrode active material occurred in the conversion reaction region is inhibited, and volume expansion of tin in the alloying reaction region is effectively inhibited by the shell.

The composite can further comprises a metal oxide other than tin oxide that contacts the surface of the conductive carbon powder. This metal oxide is an amorphous or nanosize microcrystal. The active site on the surface of the conductive carbon powder that catalyzes the electrochemical decomposition of the electrolytic solution is covered by the metal oxide, and the electrochemical decomposition of the electrolytic solution is inhibited. There is no restriction concerning the metal in the metal oxide, and Fe, Co Ni, Cu, Zn, Al, Si, Ti, Zr, La, V, Cr, Mo, W, Mn, Re, Ru, Rh Pd, Pt, Ag, Sb, Pb and Bi are exemplified. In the case there are more than one oxides including same metal with different valencies such as diiron trioxide, triiron tetraoxide and iron monoxide, any oxide can be used as the metal oxide, and a compound oxide including more than one kind of metal can also be used as the metal oxide. The metal oxide can be a single compound, or can be a mixture of more than one kind of compound. Especially, iron oxide is preferable because it is prone to be microparticulation.

The composite can further comprises a low-conductive amorphous carbon film covering an area that is included in the surface of the tin oxide powder and that does not contact the surface of the conductive carbon powder. In the repetition of charging/discharging within the potential range containing the conversion reaction region, aggregation of the composite is inhibited by the low-conductive amorphous carbon film. If the tin oxide powder covered by the low-conductive amorphous carbon film is a nanosize spherical particle of tin oxide, the surface area of tin oxide is increased, and so a Sn—O—C bond is more likely be produced. The composite comprising the low-conductive amorphous carbon film covering a spherical particle of tin oxide is also referred to as the second negative electrode active material.

The composite can further comprises a low-conductive amorphous carbon layer covering the surface of the conductive carbon powder. The composite comprising the low-conductive amorphous carbon layer can be referred to as the third negative electrode active material. The active site on the surface of the conductive carbon powder that catalyzes the electrochemical decomposition of the electrolytic solution is covered by this low-conductive amorphous carbon layer, and the electrochemical decomposition of the electrolytic solution is inhibited.

A manufacturing method of the composite has no restriction as far as it is a method to realize a highly dispersed state of the tin dioxide powder and the conductive carbon powder. For example, by mixing the conductive carbon powder with a tin oxide precursor in a dispersion media and reacting the tin oxide precursor with the surface functional group of the conductive carbon powder and thereafter heat-treating, the tin oxide precursor can be changed into tin oxide. As the tin oxide precursor, an inorganic metal compound such as tin dichloride, tin tetrachloride, tin nitrate and tin carbonate, an organic metal compound such as tin acetate, tin lactate, tetramethoxytin, tetraethoxytin and tetraisopropoxytin, or a mixture of these can be used. If a medium in which the tin oxide precursor can be dissolved and which does not give an adverse effect on the reaction is used, it is preferable because tin oxide in the negative electrode active material obtained is microparticulated.

It is extremely preferable to manufacture the composite by a method that employs a sol-gel process and dispersion at the same time in an ultracentrifuge field described below. By this reaction, nanosize tin oxide powder, preferably a spherical tin oxide particle with an average particle diameter of 1 to 10 nm, and especially preferably a spherical tin oxide particle with an average particle diameter of 1 to 2 nm can be supported on the nanosize carbon powder, preferably a spherical carbon particle with a particle diameter of 10 to 50 nm, and especially preferably KETJEN BLACK, in a highly dispersed state, and a Sn—O—C bond can be formed in more sites. Especially if KETJEN BLACK is used as the carbon powder in the method that employs a sol-gel process and dispersion at the same time in an ultracentrifuge field described below, nanosize tin oxide powder, preferably a spherical tin oxide particle with an average particle diameter of 1 to 10 nm, and especially preferably a spherical tin oxide particle with an average particle diameter of 1 to 2 nm can be effectively supported in the hollow of KETJEN BLACK.

The method that employs a sol-gel process and dispersion at the same time in an ultracentrifuge field comprises: a step of introducing, into a rotatable reactor, a reaction solution prepared by adding nanosize conductive carbon powder to a solution in which a tin oxide precursor is dissolved; and a step of rotating the reactor so as to induce a hydrolysis reaction and a polycondensation reaction of the tin oxide precursor while adding shearing stress and centrifugal force on the reaction solution, and simultaneously support a reaction product obtained on the conductive carbon powder in a highly dispersed state. By this method, the mechanical energy of both shearing stress and centrifugal force can be added simultaneously, and, probably because this mechanical energy is changed into chemical energy, the hydrolysis reaction and the polycondensation reaction of the tin oxide precursor can be performed at an unprecedented speed, and at the same time, the reaction product obtained can be supported on the surface of the conductive carbon powder in a highly dispersed state. This method to perform a sol-gel process and dispersion in an ultracentrifuge field at the same time is disclosed in JP 2007-160151 A by the applicants using an example in which titanium oxide or ruthenium oxide is supported in a high-dispersion state on carbon powder. The description regarding the statement as to the rotatable reactor and the sol-gel reaction using this reactor in this publication can be incorporated into this description as a reference without modification. In the reaction solution containing a tin oxide precursor and conductive carbon, it is particularly preferable not to add a reaction inhibitor for the hydrolysis reaction and polycondensation reaction.

The method that employs a sol-gel process and dispersion at the same time in an ultracentrifuge field can be performed by using a reactor as disclosed in FIG. 1 of JP 2007-160151 A, that is, a reactor comprising concentric cylinders of an outer cylinder and an inner cylinder, the inner cylinder having through-holes on the side surface thereof, the outer cylinder having a sheathing at the aperture thereof In this method, a compound described above as the tin oxide precursor can be used. As a solvent to dissolve this precursor, a solvent in which this precursor can be dissolved and which does not adversely affect the reaction can be used without restriction, and water, methanol, ethanol, and iso-propyl alcohol can be suitably used. Moreover, a solution in which NaOH, KOH, $Na_2CO_3$, $NaHCO_3$ or $NH_4OH$ is dissolved in the solvent can be used for hydrolysis. Water can also be used for hydrolysis of the tin oxide precursor.

The solution in which the tin oxide precursor is dissolved and the conductive carbon powder are introduced into the innner cylinder of the reactor, the inner cylinder is rotated to mix and disperse the tin oxide precursor and the carbon powder. Then, an alkaline solution or the like for hydrolysis of the tin oxide precursor is introduced into the inner cylinder and the inner cylinder is rotated again. As a result of the centrifugal force by rotation of the inner cylinder, the reaction solution in the inner cylinder is moved to the inner wall surface of the outer cylinder through the hole of the inner cylinder, and a thin film containing the tin oxide precursor is formed on the inner wall surface of the outer cylinder, and this tin film is made to slide up to the upper part of the inner wall of the outer cylinder. As a result, shearing stress and centrifugal force are added to this film, and probably because this mechanical energy is changed into the chemical energy necessary for the reaction, so-called activation energy, the hydrolysis and the polycondensation reaction of the tin oxide precursor progress in a short period of time.

In the reaction, the mechanical energy added becomes larger as the thickness of the thin film becomes thinner. The thickness of the thin film is generally 5 mm or less, preferably 2.5 mm or less, and especially preferably 1 mm or less. The thickness of the thin film can be set by the width of the sheathing of the reactor and the quantity of the reaction solution introduced into the reactor.

The reaction is considered to be realized by the mechanical energy of shearing stress and the centrifugal force added to the reaction solution, but the shearing stress and the centrifugal force are produced by the centrifugal force added to the reaction solution by rotation of the inner cylinder. The centrifugal force added to the reaction solution of the inner cylinder is generally 1500 $kgms^{-2}$ or more, preferably 70000 $kgms^{-2}$ or more, and especially preferably 270000 $kgms^{-2}$ or more.

By stopping the rotation of the inner cylinder, retrieving the conductive carbon powder and drying it after the reaction, a composite, in which nanosize tin oxide powder, preferably a spherical tin oxide particle with an average particle diameter of 1 to 10 nm, and especially preferably a spherical tin oxide particle with an average particle diameter of 1 to 2 nm is supported on the surface of the carbon powder in a highly dispersed state, can be obtained.

In the sol-gel process in an ultracentrifuge field using this reactor, the ratio of tin dioxide and tin monoxide supported by the carbon powder is changed according to the kind of conductive carbon powder used. If carbon powder which has a large surface area and in which oxygen atoms (oxygen of the surface functional group, adsorbed oxygen) are abundantly contained is used, the proportion of tin dioxide increases. In the case where KETJEN BLACK, which is suitable as the carbon powder, is used, if a tin oxide precursor having divalent tin is used as a raw material, only tin dioxide is produced as far as can be judged by the X-ray powder diffraction pattern. Also, according to the TEM photograph, a fine spherical particle of tin dioxide is preferentially supported in the hollow of KETJEN BLACK.

The composite which further comprises a metal oxide other than tin oxide that contacts the surface of the conductive carbon powder can be manufactured by a method, for example, of mixing conductive carbon powder with a tin oxide precursor and a metal oxide precursor in a dispersion medium, reacting the tin oxide precursor and the metal oxide precursor with the surface functional group of the conductive carbon powder, and thereafter changing the tin oxide precursor and the metal oxide precursor into tin oxide and a metal oxide by heat-treating. After the tin oxide precursor is changed into tin oxide by mixing the conductive carbon powder with the tin oxide precursor in the dispersion medium, reacting the tin oxide precursor with the surface functional group of the conductive carbon powder and heat-treating, by mixing the product obtained and the metal oxide precursor in the dispersion medium, reacting the surface functional group of the product and the metal oxide precursor and heat-treating, the metal oxide precursor can also be changed into a metal oxide. Also, after the metal oxide precursor is changed into a metal oxide by mixing the conductive carbon powder with the metal oxide precursor in the dispersion medium, reacting the metal oxide precursor and the surface functional group of the conductive carbon powder and heat-treating, by mixing the product obtained and the tin oxide precursor in the dispersion medium, reacting the surface functional group of the product and the tin oxide precursor and heat-treating, the tin oxide precursor can also be changed into tin oxide. The "metal oxide precursor" means a compound that is changed into a metal oxide through a manufacturing step of a negative electrode active material, but a tin oxide precursor is excluded.

In this method, a compound mentioned above as the tin oxide precursor can be used. As the metal oxide precursor, an inorganic metal compound such as chloride, nitrate and carbonate of various metals, an organometallic compound such as acetate, lactate, tetraethoxide, tetraisopropoxide and tetrabutoxide of various metals, or a mixture thereof can be used. It is preferable that a medium that can dissolve the tin oxide precursor and the metal oxide precursor and that does not adversely affect the reaction is used as a dispersion medium, because tin oxide and the metal oxide in the negative electrode active material obtained are microparticulated.

Moreover, the composite comprising a metal oxide other than tin oxide that contacts the surface of the conductive carbon powder can be obtained by using the tin oxide precursor and the metal oxide precursor at the same time in the above-mentioned method that employs a sol-gel process and dispersion at the same time. By this method, the hydrolysis reaction and polycondensation reaction of the tin oxide precursor and the metal oxide precursor can take place at an unprecedented speed and, at the same time, the reaction product obtained can be supported on the conductive carbon powder in a highly dispersed state. In this method, a compound mentioned above as the tin oxide precursor can be used, and a compound mentioned as the metal oxide precursor can be used.

The composite that further comprises a low-conductive amorphous carbon film covering the area which is included in the surface of tin oxide powder and which does not contact the surface of the conductive carbon powder (second negative electrode active material), can be obtained by using polyvinyl alcohol together with the tin oxide precursor and, whenever necessary, the metal oxide precursor in the method that employs a sol-gel process and dispersion at the same time. In this embodiment, the hydrolysis reaction and polycondensation reaction of the tin oxide precursor and the metal oxide precursor used as the case may be can be carried out, nanosize, spherically-shaped reaction products of the tin oxide precursor and the metal oxide precursor used as the case may be can be obtained, and at the same time, the reaction product of the tin oxide precursor and the metal oxide precursor used as the case may be can be supported on the conductive carbon powder in a highly dispersed state. At the same time, by strong mutual interaction between the tin oxide precursor and/or the reaction product of the tin oxide precursor and a hydroxyl group in polyvinyl alcohol and/or an oxygen ion formed by dissociation of hydroxyl group in polyvinyl alcohol, polyvinyl alcohol can be attached to the surface of the reaction product of the tin oxide precursor. Moreover, the particle diameter of the reaction product of the tin oxide precursor becomes miniaturized compared with the particle diameter of a reaction product obtained from a reaction solution that does not use polyvinyl alcohol. Then, when the product obtained is dried and polyvinyl alcohol is pyrolyzed (incomplete combustion) under the condition of about 500 degrees centigrade or less, preferably 450 to 500 degrees centigrade, in a non-oxidizing atmosphere, preferably in an inert atmosphere such as nitrogen or argon, a thin film of an amorphous carbon derived from polyvinyl alcohol covers the area which does not contact the surface of the conductive carbon powder in the surface of a nanosize tin oxide spherical particle, preferably a spherical tin oxide particle with an average particle diameter of 1 to 10 nm, and particularly a spherical tin oxide particle with an average particle diameter of 1 to 2 nm. Pyrolysis (incomplete combustion) in a non-oxidizing atmosphere can be carried out at the same time as the formation of a low-conductive amorphous carbon layer covering the surface of the conductive carbon powder described below. Since aggregation of the negative electrode active material through experience of the charge-discharge cycle is inhibited by the amorphous carbon film derived from this polyvinyl alcohol, in this embodiment, excellent cycling characteristics can be obtained even if a tin oxide particle exists on the surface of the conductive carbon powder. If suitable KETJEN BLACK is used as the conductive carbon powder, tin oxide particles in a greater quantity than can be accommodated in the hollow of KETJEN BLACK can be contained in the composite, and excellent cycling characteristics can be obtained even if the mass of the tin oxide precursor in the reaction solution to be introduced into a rotatable reactor is increased to the range of 1.5 to 4 times of the mass of KETJEN BLACK in terms of tin dioxide.

The composite in which a low-conductive amorphous carbon layer covering the surface of the conductive carbon powder is further comprised (third negative electrode active material) can be obtained by a method comprising a kneading step of obtaining a kneaded material of the composite and an amorphous carbon precursor and a heat treatment step of heat-treating the kneaded material to form a low-conductive amorphous carbon layer by pyrolytic decomposition of the amorphous carbon precursor. As the composite, the conductive carbon powder supporting a tin oxide particle obtained by the method of employing a sol-gel process and dispersion at the same time in an ultracentrifuge field, the conductive carbon powder further supporting a metal oxide other than tin oxide, and the conductive carbon powder supporting a tin oxide covered with polyvinyl alcohol or an amorphous carbon film derived with polyvinyl alcohol can be preferably used.

The "amorphous carbon precursor" means a compound that is pyrolyzed by heat treatment (incomplete combustion) and changes into amorphous carbon, but a compound that volatilizes before pyrolysis is not included. As the amorphous carbon precursor, an amino acid such as glutamic acid and aspartic acid, a monosaccharide such as glucose and mannose, an oligosaccharide such as lactose and maltotriose, a polysaccharide such as starch, cellulose and dextrin, a hydroxy acid such as malic acid, tartaric acid and citramalic acid, a fatty acid such as palmitic acid, stearic acid, oleic acid and linoleic acid, a polyol such as ethylene glycol, glycerol, erythritol, arabinitol, polyethylene glycol and polyvinyl alcohol and a derivative thereof, such as carboxymethylcellulose, hydroxypropylcellulose, oleodistearate and oleodipalmitate are exemplified.

In the kneading step, a kneaded material is obtained by combining the composite, the amorphous carbon precursor and an adequate quantity of a dispersion medium, and kneading while, as need arises, evaporating the dispersion medium. As the dispersion medium for kneading, a medium that does not adversely affect the composite can be used without restriction, and water, methanol, ethanol or isopropyl alcohol can be suitably used. It is preferable if a dispersion medium which can dissolve the amorphous carbon precursor is used, because a uniform amorphous carbon layer is likely to be formed, and as needed, an acidic dispersion or an alkaline dispersion can be used. The ratio of the composite and the amorphous carbon precursor is, in terms of the mass ratio, generally within the range of 3:1 to 1:3, and preferably within the range of 1.5:1 to 1:1.5. By this kneading step, a layer of the amorphous carbon precursor is formed at least in the area which is included the surface of the conductive carbon powder and which does not contact the tin oxide or, as the case may be, the supported metal oxide. Generally, the amorphous carbon precursor also invades the gaps formed among the adjacent grains of the composite. Then, in the heat treatment step, heat treatment is given after the obtained kneaded material is dried as needed, the amorphous carbon precursor is pyrolyzed (incomplete combustion) and changed into low-conductive amorphous carbon. Heat treatment is given in a non-oxidizing atmosphere, preferably in an inert atmosphere such as nitrogen and argon, at a temperature of about 500 degrees centigrade or less, preferably 450 to 500 degrees centigrade. By this heat treatment step, a low-conductive amorphous carbon layer is formed at least in an area which is included the surface of the conductive carbon powder and which does not contact the tin oxide or, as the case may be, the supported metal oxide. Generally, a low-conductive amorphous carbon layer is also formed in the gaps that are formed between adjacent grains of the composite. Therefore, the specific surface area of the negative electrode active material obtained is as a consequence lower than the specific surface area of the composite. This is also considered to contribute to the lowered initial irreversible capacity.

As the amorphous carbon precursor, an amino acid represented by formula (A) is preferable.

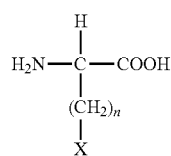

(A)

In the formula, n is an integer 1 to 4, and X is hydroxy group, amino group or carboxyl group. As the amino acid represented by formula (A), glutamic acid, aspartic acid, aminopimelic acid, homoserine, lysine and serine are exemplified. By using the amino acid, the initial irreversible capacity resulting from the conductive carbon powder is effectively decreased. The reason for this is not identified at this moment, but it is considered that, when these amino acids are heat-treated in a non-oxidizing atmosphere in the heat treatment step, either one of an amino group and a carboxy group combined with an asymmetric carbon atom and group X are reacted and a cyclic compound is formed, this cyclic compound is slowly pyrolyzed on the conductive carbon powder, and after heat treatment, a dense low-conductive amorphous carbon layer that effectively inhibits the accession of electrolytic solution to the surface of the conductive carbon powder is formed on the surface of the conductive carbon powder.

(2) Manufacture of the First Negative Electrode Active Material

The first negative electrode active material comprises a granulated substance in which an above-mentioned composite and an aggregate selected from the group consisting of graphite and nongraphitizable carbon are aggregated. This negative electrode active material can be obtained by performing a method comprising: a mixing step of obtaining a mixture of the above-mentioned composite and an aggregate selected from the group consisting of graphite and nongraphitizable carbon; and a granulation step of pulverizing the mixture to obtain a granulated substance by agglomeration of the composite and the aggregate.

In the manufacturing method of the present invention, a commercially available graphite and nongraphitizable carbon can be used. However, since these are used as an aggregate, those which have a bigger average particle diameter than the grain of the composite are used. The average particle diameter of graphite and nongraphitizable carbon is generally within the range of 1 to 300 μm, preferably 2 to 50 μm, and especially preferably 5 to 30 μm. More than one graphite and/or nongraphitizable carbon with different grain diameters can be mixed and used. There is no strict restriction on the shape of the grain of graphite and nongraphitizable carbon.

Graphite is suitable as the aggregate because it has a larger reversible capacity and bulk density compared with nongraphitizable carbon. Also, compared with a case where spherical graphite is used, it is preferable to use scaly graphite because the scaly graphite is likely to be miniaturized by pulverization in the granulation step and a dense granulated substance can be obtained.

The composite and the aggregate are generally mixed in a powdering machine. The mass ratio of the composite and the aggregate is preferably in the range of 4:1 to 1:4 when graphite is used as the aggregate while a range of 4:1 to 1:1 is preferable when nongraphitizable carbon is used as the aggregate. If the quantity of the composite is larger than the above-mentioned range, the unevenness of the capacity of a negative electrode active material becomes large, and if the quantity of the composite is smaller than the above-mentioned range, the value of the reversible capacity in the negative electrode active material becomes small.

As the powdering machine used in the granulation step, a powdering machine for fine grinding or ultrafine grinding is suitably used. A raikai mixer, ball mill, bead mill, rod mill, roller mill, agitation mill, planetary mill, hybridizer, mechanochemical composite device and jet mill are exemplified. Especially, if a jet mill is used, a granulated substance with a dense and stable structure containing a fine aggregate is effectively obtained because pulverization efficiency is high.

Milling time changes according to the type of powdering machine used and the quantity of a composite and an aggregate introduced into the powdering machine, but generally it is within the range of 5 minutes to 10 hours, preferably 10 minutes to 2 hours. Both wet grinding and dry grinding are suitable, but dry grinding is preferable because a dense granulated substance can be easily obtained.

In the course of pulverization, a coarse grain of the aggregate is aggregated while capturing fine grains produced by pulverization and the composite, and as a result, a granulated substance in which the aggregate and the composite are densely aggregated is formed. When a lithium ion secondary battery is constituted by using this granulated substance as a negative electrode active material, electrochemical decomposition of an electrolytic solution occurs on the outer surface of the granulated substance and SEI is formed on the outer surface of the granulated substance. The solvent of the electrolytic solution cannot pass through this SEI of the outer surface of the granulated substance, and accordingly, the contact area between the electrolytic solution and the carbon material can be decreased, so that the initial irreversible capacity that probably results from the electrochemical decomposition of the electrolytic solution on the carbon material surface can be remarkably reduced. Moreover, the reversible capacity of graphite and nongraphitizable carbon used as the aggregate is smaller than the reversible capacity of the composite, but since the bulk density of the granulated substance obtained by pulverization remarkably increases compared with the bulk density of the composite alone, the decrease in reversible capacity, which occurs in a case where the granulated substance is used as a negative electrode active material, is inhibited, or rather, the reversible capacity is increased.

(3) Usage of a Negative Electrode Active Material

The first, second and third negative electrode active materials of the present invention are suitable for a lithium ion secondary battery. Therefore, the present invention also offers a lithium ion secondary battery comprising: a negative electrode comprising the negative electrode active material of the present invention, a positive electrode and a separator retaining a nonaqueous electrolytic solution placed between the negative electrode and the positive electrode.

The negative electrode of the lithium ion secondary battery in the present invention can be formed by placing an active material layer comprising the negative electrode active material of the present invention on a current collector.

As the current collector, an electroconductive material including platinum, gold, nickel, aluminum, titanium, steel and carbon can be used. Regarding the shape of the current collector, any shape including a film, foil, plate, mesh, expanded metal, or cylinder can be adopted.

The active material layer is formed by using a mixed material in which a binder and an electrical conducting material are added, as needed, to the negative electrode active material of the present invention.

As the binder, a heretofore known binder such as polytetrafluoroethylene, polyvinylidene fluoride, tetrafluoroethylene-hexafluoropropylene copolymer, polyvinyl fluoride, and carboxymethylcellulose are used. The content of the binder is preferably 1 to 30% by mass of the total amount of the mixed material. If the content of the binder is 1% by mass or less, the strength of the active material layer is not enough, and if the content of the binder is 30% by mass or more, inconveniences such as a decrease in the discharge capacity of the negative electrode or excessive internal resistant occur. As the electrical conducting material, carbon powder such as carbon black, natural graphite and artificial graphite can be used.

The negative electrode using the mixed material can be formed by dispersing the negative electrode active material of the present invention and, as needed, other additives in a solvent in which the binder is dissolved, and coating the dispersion obtained on the current collector by a doctor blade method or the like and drying it. It is also possible to add a solvent as needed to the mixed material obtained, shape it a given shape, and crimp it on the current collector.

As the separator, for example, a polyolefin fiber nonwoven fabric and a glass fiber nonwoven fabric are suitably used. As the electrolytic solution supported in the separator, an electrolytic solution in which an electrolyte is dissolved in a nonaqueous solvent is used, and a heretofore known nonaqueous electrolytic solution can be used without restriction.

As the solvent of the nonaqueous electrolytic solution, electrochemically stable ethylene carbonate, propylene carbonate, butylene carbonate, dimethylcarbonate, ethyl methyl carbonate, diethyl carbonate, sulfolane, 3-methylsulfolane, γ-butyrolactone, acetonitrile and dimethoxyethane, N-methyl-2-pyrrolidone, dimethylformamide, or a mixture thereof can be suitably used.

As the solute of the nonaqueous electrolytic solution, a salt which generates lithium ion when it is dissolved in organic electrolytic solution can be used without any restriction. For example, $LiPF_6$, $LiBF_4$, $LiClO_4$, $LiN(CF_3SO_2)_2$, $LiCF_3SO_3$, $LiC(SO_2CF_3)_3$, $LiN(SO_2C_2F_5)_2$, $LiAsF_6$, $LiSbF_6$, or a mixture thereof can be suitably used. In addition, as the solute of the nonaqueous electrolytic solution, a quaternary ammonium salt or a quaternary phosphonium salt with a quaternary ammonium cation or a quaternary phosphonium cation can be used. For example, a salt consisting of a cation represented by $R_1R_2R_3R_4N^+$ or $R_1R_2R_3R_4P^+$ ($R_1$, $R_2$, $R_3$, and $R_4$ refer to a C1-C6 alkyl group) and an anion of $PF_6^-$, $BF_4^-$, $ClO_4^-$, $N(CF_3SO_3)_2^-$, $CF_3SO_3^-$, $C(SO_2CF_3)_3^-$, $N(SO_2C_2F_5)_2^-$, $AsF_6^-$, or $SbF_6^-$, or a mixture thereof can be suitably used.

As the positive electrode active material to constitute the positive electrode, a heretofore known positive electrode active material which can occlude and release lithium can be used without restriction. For example, a compound oxide of lithium and a transition metal such as $LiMn_2O_4$, $LiMnO_2$, $LiV_3O_5$, $LiNiO_2$ and $LiCoO_2$, sulfide such as $TiS_2$ and $MoS_2$, selenide such as $NbSe_3$, an oxide of transition metal such as $Cr_3O_8$, $V_2O_5$, $V_5O_{13}$, $VO_2$, $Cr_2O_5$, $MnO_2$, $TiO_2$ and $MoV_2O_8$, a conductive polymer such as polyfluorene, polythiophene, polyaniline and polyparaphenylene can be used.

An active material layer for the positive electrode can be formed using a mixed material in which a binder or electrical conducting material illustrated concerning the negative electrode is added as needed to the positive electrode active material. The positive electrode using this mixed material can be manufactured by dispersing the positive electrode active material and, as needed, other additives in a solvent in which the binder is dissolved, and coating the obtained dispersion on a current collector illustrated regarding the negative electrode by a doctor blade method or the like and drying it. It is also possible to add a solvent as needed to the mixed material obtained, shape it a given shape, and crimp it on the current collector.

The negative electrode active material of the present invention is suitable as a negative electrode active material for a hybrid capacitor as well as for a lithium ion secondary battery. In the hybrid capacitor, activated carbon, carbon nanotube, and mesoporous carbon can be used as a positive electrode active material, and an electrolytic solution in which a lithium salt such as $LiPF_6$, $LiBF_4$ and $LiClO_4$ is dissolved in a nonaqueous solvent such as ethylene carbonate, dimethylcarbonate and diethyl carbonate is used.

EXAMPLES

The examples of the present invention are shown as follows, but the present invention is not limited to the following examples.

(1) A Composite Containing a Low-Conductive Amorphous Carbon Film Covering the Surface of the Spherical Tin Oxide Particle (Second Negative Electrode Active Material)

(a) Manufacture of the Negative Electrode Active Material

Example 1

To an inner cylinder of a reactor shown in FIG. 1 of JP 2007-160151 A, which is composed of a pair of outer and inner concentric cylinders with through-holes on the side surface of the inner cylinder and a sheathing at the aperture of the outer cylinder, a solution in which 5.64 g of $SnCl_2 \cdot 2H_2O$ is dissolved in 120 mL of water was introduced, and further, 0.56 g of polyvinyl alcohol, 3.2 mL of hydrochloric acid at the concentration of 2 M, and 1.61 g of KETJEN BLACK (trade name: KETJEN BLACK EC600J, manufacturer: Ketjen Black International, initial particle diameter: 34 nm, pore size: 4 nm, specific surface area: 1520 m$^2$/g, amount of oxygen 6.1 mmol/g) were introduced, and the inner cylinder was rotated for 300 seconds so that centrifugal force of 70000 kgms$^{-2}$ was applied to the reaction solution, and SnCl$_2$.2H$_2$O, polyvinyl alcohol and KETJEN BLACK were made to be dispersed. The charge at the time of reaction of SnCl$_2$.2H$_2$O and KETJEN BLACK was SnO$_2$: KETJEN BLACK=70:30 at a mass ratio. The rotation of the inner cylinder was stopped, and 56.4 mL of NaOH aqueous solution at the concentration of 1 M was added to the inside of the inner cylinder and the inner cylinder was rotated for 300 seconds so that centrifugal force of 70000 kgms$^{-2}$ was applied to the reaction solution again. In the meantime, a thin film was composed on the inner wall of the outer cylinder, shearing stress and centrifugal force were applied to this thin film, and hydrolysis and polycondensation of SnCl$_2$ proceeded.

After the rotation of the inner cylinder was stopped, KETJEN BLACK was filtered and retrieved, and was dried for 12 hours at 180 degrees centigrade within a vacuum. Then, polyvinyl alcohol was pyrolyzed by heat-treating the dried KETJEN BLACK for one hour at 500 degrees centigrade in nitrogen, and a negative electrode active material in which the surface of a tin oxide particle was covered with a thermolysis product of polyvinyl alcohol was obtained. When the negative electrode active material obtained was checked by X-ray powder diffraction, it was found that tin dioxide had been produced (see FIG. 2). A diffraction peak of the thermolysis product of polyvinyl alcohol was not found, and amorphous carbon was formed.

Comparative Example 1

In the inner cylinder of the reactor used in Example 1, a solution in which 5.64 g of SnCl$_2$.2H$_2$O was dissolved in 120 mL of water was introduced, and further, 3.2 mL of hydrochloric acid at the concentration of 2 M and 2.50 g of KETJEN BLACK (trade name: KETJEN BLACK EC600J, manufacturer: Ketj en Black International, initial particle diameter: 34 nm, pore size: 4 nm, specific surface area: 1520 m$^2$/g, amount of oxygen 6.1 mmol/g) were introduced, and the inner cylinder was rotated for 300 seconds so that centrifugal force of 70000 kgms$^{-2}$ was applied to the reaction solution, and SnCl$_2$.2H$_2$O and KETJEN BLACK were made to be dispersed. The charge at the time of reaction of SnCl$_2$.2H$_2$O and KETJEN BLACK was SnO$_2$: KETJEN BLACK=60:40 at a mass ratio. The rotation of the inner cylinder was stopped, and 56.4 mL of NaOH aqueous solution at the concentration of 1 M was added to the inside of the inner cylinder and the inner cylinder was rotated for 300 seconds so that centrifugal force of 70000 kgms$^{-2}$ was applied to the reaction solution again. In the meantime, a thin film was composed on the inner wall of the outer cylinder, shearing stress and centrifugal force were applied to this thin film, and hydrolysis and polycondensation of SnCl$_2$ proceeded. After the rotation of the inner cylinder was stopped, KETJEN BLACK was filtered and retrieved, and was dried for 12 hours at 180 degrees centigrade within a vacuum, and a negative electrode active material was obtained. When the negative electrode active material obtained was checked by X-ray powder diffraction, it was found that tin dioxide had been produced (see FIG. 2).

Comparative Example 2

In the inner cylinder of the reactor used in Example 1, a solution in which 5.64 g of SnCl$_2$.2H$_2$O was dissolved in 120 mL of water was introduced, and further, 3.2 mL of hydrochloric acid at the concentration of 2 M and 1.61 g of KETJEN BLACK (trade name: KETJEN BLACK EC600J, manufacturer: Ketj en Black International, initial particle diameter: 34 nm, pore size: 4 nm, specific surface area: 1520 m$^2$/g, amount of oxygen 6.1 mmol/g) were introduced, and the inner cylinder was rotated for 300 seconds so that centrifugal force of 70000 kgms$^{-2}$ was applied to the reaction solution, and SnCl$_2$.2H$_2$O and KETJEN BLACK were made to be dispersed. The charge at the time of reaction of SnCl$_2$.2H$_2$O and KETJEN BLACK was SnO$_2$: KETJEN BLACK=70:30 at a mass ratio. The rotation of the inner cylinder was stopped, and 56.4 mL of NaOH aqueous solution at the concentration of 1 M was added to the inside of the inner cylinder and the inner cylinder was rotated for 300 seconds so that centrifugal force of 70000 kgms$^{-2}$ was applied to the reaction solution again. In the meantime, a thin film was composed on the inner wall of the outer cylinder, shearing stress and centrifugal force were applied to this thin film, and hydrolysis and polycondensation of SnCl$_2$ proceeded. After the rotation of the inner cylinder was stopped, KETJEN BLACK was filtered and retrieved, and was dried for 12 hours at 180 degrees centigrade within a vacuum, and a negative electrode active material was obtained. When the negative electrode active material obtained was checked by X-ray powder diffraction, it was found that tin dioxide had been produced (see FIG. 2).

Comparative Example 3

In the inner cylinder of the reactor used in Example 1, a solution in which 5.64 g of SnCl$_2$.2H$_2$O was dissolved in 120 mL of water was introduced, and further, 0.56 g of polyethylene oxide, 3.2 mL of hydrochloric acid at the concentration of 2 M and 1.61 g of KETJEN BLACK (trade name: KETJEN BLACK EC600J, manufacturer: Ketjen Black International, initial particle diameter: 34 nm, pore size: 4 nm, specific surface area: 1520 m$^2$/g, amount of oxygen 6.1 mmol/g) were introduced, and the inner cylinder was rotated for 300 seconds so that centrifugal force of 70000 kgms$^{-2}$ was applied to the reaction solution, and SnCl$_2$.2H$_2$O, polyethylene oxide and KETJEN BLACK were made to be dispersed. The charge at the time of reaction of SnCl$_2$.2H$_2$O and KETJEN BLACK was SnO$_2$: KETJEN BLACK=70:30 at a mass ratio. The rotation of the inner cylinder was stopped, and 56.4 mL of NaOH aqueous solution at the concentration of 1 M was added to the inside of the inner cylinder and the inner cylinder was rotated for 300 seconds so that centrifugal force of 70000 kgms$^{-2}$ was applied to the reaction solution again. In the meantime, a thin film was composed on the inner wall of the outer cylinder, shearing stress and centrifugal force were applied to this thin film, and hydrolysis and polycondensation of SnCl$_2$ proceeded.

After the rotation of the inner cylinder was stopped, KETJEN BLACK was filtered and retrieved, and was dried for 12 hours at 180 degrees centigrade within a vacuum. Then the dried KETJEN BLACK was heat-treated for an hour at 500 degrees centigrade in nitrogen and polyethylene oxide was pyrolyzed, and a negative electrode active material was obtained.

Comparative Example 4

In the inner cylinder of the reactor used in Example 1, a solution in which 5.64 g of SnCl$_2$.2H$_2$O was dissolved in 120 mL of water was introduced, and further, 0.56 g of sodium polyacrylate, 3.2 mL of hydrochloric acid at the concentration of 2 M and 1.61 g of KETJEN BLACK (trade name: KETJEN BLACK EC600J, manufacturer: Ketjen Black International, initial particle diameter: 34 nm, pore size: 4 nm, specific surface area: 1520 m²/g, amount of oxygen 6.1 mmol/g) were introduced, and the inner cylinder was rotated for 300 seconds so that centrifugal force of 70000 kgms$^{-2}$ was applied to the reaction solution, and $SnCl_2.2H_2O$, polyacrylic acid and KETJEN BLACK were made to be dispersed. The charge at the time of reaction of $SnCl_2.2H_2O$ and KETJEN BLACK was $SnO_2$: KETJEN BLACK=70:30 at a mass ratio. The rotation of the inner cylinder was stopped, and 56.4 mL of NaOH aqueous solution at the concentration of 1 M was added to the inside of the inner cylinder and the inner cylinder was rotated for 300 seconds so that centrifugal force of 70000 kgms$^{-2}$ was applied to the reaction solution again. In the meantime, a thin film was composed on the inner wall of the outer cylinder, shearing stress and centrifugal force were applied to this thin film, and hydrolysis and polycondensation of $SnCl_2$ proceeded.

After the rotation of the inner cylinder was stopped, KETJEN BLACK was filtered and retrieved, and was dried for 12 hours at 180 degrees centigrade within a vacuum. Then the dried KETJEN BLACK was heat-treated for an hour at 500 degrees centigrade in nitrogen and polyacrylic acid was pyrolyzed, and a negative electrode active material was obtained.

For the negative electrode active material of Example 1 and the negative electrode active material of Example 2, a TG measurement within the temperature range of room temperature to 900 degrees centigrade was taken under the condition of the temperature rising by a rate of 1 degree centigrade/minute in air atmosphere, and the composition ratio of tin dioxide and carbon was calculated by considering the weight reduction amount at 200 degrees centigrade or more as the carbon amount. Also, the difference between the weight reduction amount of the negative electrode active material in Example 1 and the weight reduction amount of the negative electrode active material in Comparative Example 2 at 900 degrees centigrade was regarded as the carbon amount derived from polyvinyl alcohol. As a result, the mass ratio of the amount of tin dioxide and the amount of carbon in the negative electrode active material of Comparative Example 2 was $SnO_2$: carbon derived from KETJEN BLACK=68.6:31.4, and thus a value almost the same as the charge at the time of reaction ($SnO_2$: KETJEN BLACK=70:30 at a mass ratio) was obtained. Also, the amount of tin dioxide and the amount of carbon in the negative electrode active material of Example 1 was $SnO_2$: carbon derived from KETJEN BLACK: carbon derived from polyvinyl alcohol=65.4:29.9:4.8, and thus a value almost the same as the charge at the time of reaction ($SnO_2$: KETJEN BLACK=70:30 at a mass ratio) was obtained.

FIG. 1 shows TEM photographs of the negative electrode active materials of Example 1 and Comparative Examples 1 and 2. In the TEM photograph (B) of the negative electrode active material of Comparative Example 1, a spherical particle of tin oxide was not found on the outer surface of KETJEN BLACK, and a spherical particle of tin oxide existed in the hollow of KETJEN BLACK, but in the negative electrode active material of Comparative Example 2 shown in (C), a coarse grain of tin oxide was formed on the surface of KETJEN BLACK, as shown by an arrow. On the other hand, in the negative electrode active material of Example 1, a coarse particle of tin oxide was not found, and a spherical particle of tin oxide with a particle diameter of 1 to 2 nm covered with a carbon film was formed on the surface of KETJEN BLACK.

Figure 2:
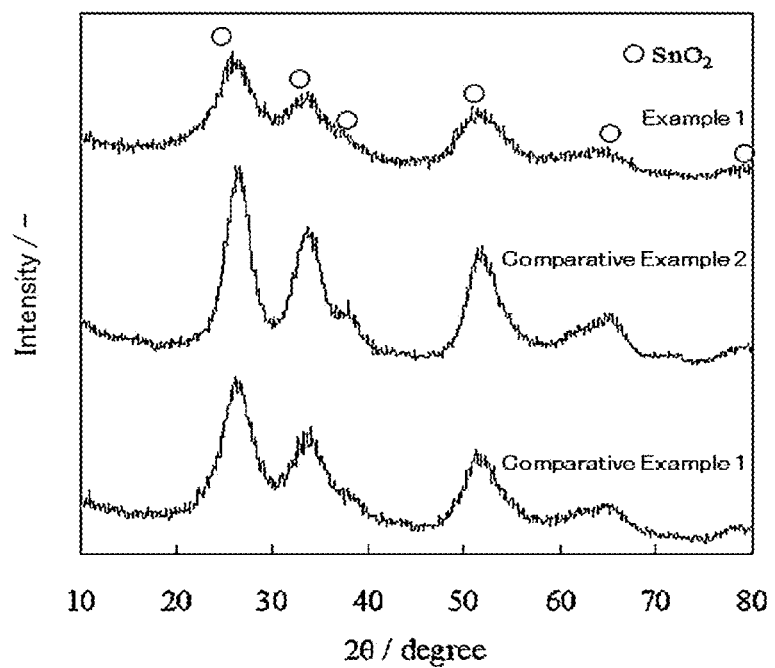
FIG. 2 shows an X-ray powder diffraction diagram of a negative electrode active material with an amorphous carbon film covering the surface of the tin oxide particle.

FIG. 2 shows X-ray powder diffraction diagrams of the negative electrode active materials of Example 1 and Comparative Examples 1 and 2. In every negative electrode active material, the crystallinity of the spherical particle of tin oxide was low, but the crystallite of the tin oxide particle in the negative electrode active material of Comparative Example 2 was relatively large, and the crystallite of the tin oxide particle in the negative electrode active material of Example1 was relatively small. Therefore, it is found that in the manufacturing method of the negative electrode active material of the present invention, miniaturization of the tin oxide particle has been achieved by using polyvinyl alcohol.

Figure 3:
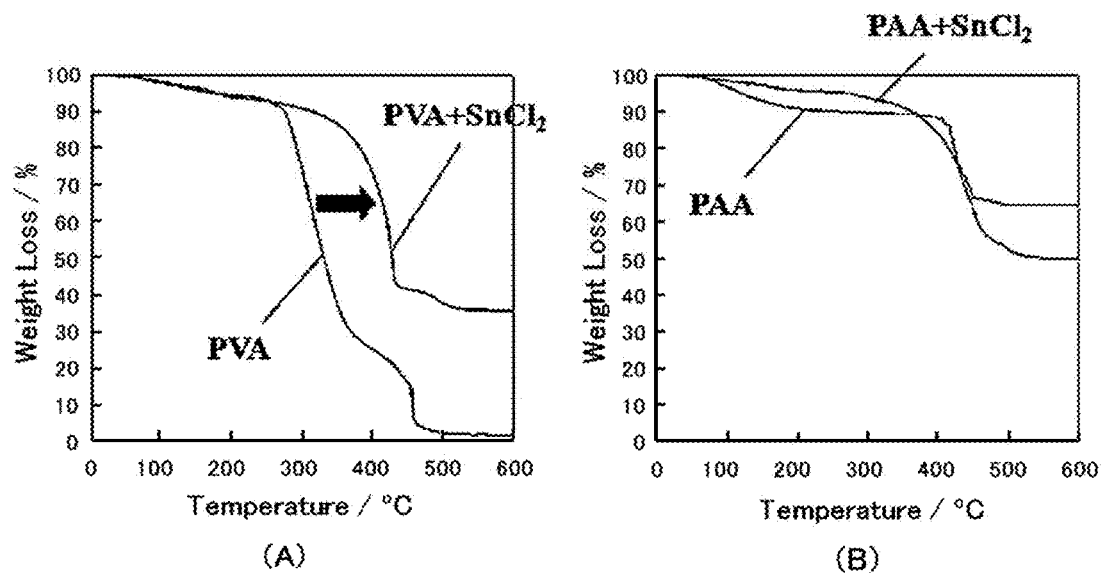
FIG. 3 shows the result of TG analysis to investigate the mutual reaction between a polymer and tin dichloride; (A) is a result for powder containing polyvinyl alcohol and (B) is a result for powder containing sodium polyacrylate.

Mutual interaction of the polymers of polyvinyl alcohol used in Example 1, polyethylene oxide used in Comparative Example 3 and sodium polyacryte used in Comparative Example 4 and $SnCl_2.2H_2O$ was investigated by TG analysis. A TG measurement within the temperature range of the room temperature to 600 degrees centigrade was taken under the condition of the temperature rising at a rate of 10 degrees centigrade/minute in nitrogen atmosphere for a fine particle obtained by adding any one of the polymers, $SnCl_2.2H_2O$ and hydrochloric acid to water, heating them for 1 hour at 80 degrees centigrade and then drying. As a comparison, the same evaluation was carried out for a fine particle obtained by adding any one polymer of polyvinyl alcohol, polyethylene oxide and sodium polyacrylate and hydrochloric acid to water, heating them for 1 hour at 80 degrees centigrade and then drying. FIG. 3(A) shows the measurement result of the fine particle containing polyvinyl alcohol (PVA) and FIG. 3(B) shows the measurement result of the fine particle containing polyacrylic acid (PAA). The measurement result of the fine particle containing polyethylene oxide was the same as FIG. 3(B).

The pyrolysis behavior of the fine particle containing polyvinyl alcohol (see FIG. 3(A)) was largely influenced by the coexistence of $SnCl_2$, and under the coexistence of $SnCl_2$ the initiation temperature of pyrolysis of polyvinyl alcohol shifted to a high temperature by 100 degrees centigrade or more. It is considered that this is due to the strong mutual interaction between a hydroxyl group of polyvinyl alcohol and/or an oxygen ion formed by dissociation of hydroxyl group of polyvinyl alcohol and $SnCl_2$. On the contrary, the pyrolysis behavior of the fine particle containing polyacrylic acid (see FIG. 3(B)) is hardly affected by the coexistence of $SnCl_2$. It is considered that the mutual interaction between the carboxylate ion of polyacrylic acid and $SnCl_2$ does not exist or is quite small. From these findings, it was considered that, in the manufacturing method of the present invention, by strong mutual interaction between the tin salt and/or the reaction product of sol-gel reaction of the tin salt and a hydroxyl group of polyvinyl alcohol and/or an oxygen ion formed by dissociation of hydroxyl group of polyvinyl alcohol, polyvinyl alcohol was attached to the surface of the reaction product, and this attained miniaturization of the spherical particle of tin oxide.

(b) Preparation of a Half Cell

A half cell was prepared in which a molding, which was obtained by adding to 0.7 mg of each negative electrode active material of Example 1 and Comparative Examples 1 to 4 the 30% by mass of the total of polyvinylidene fluoride and shaping the mixture, was used as a negative electrode, a 1 M LiPF$_6$ ethylene carbonate/diethylcarbonate 1:1 solution was used as an electrolytic solution, and lithium was used as a counter electrode.

(c) Charging/Discharging Characteristics

For the half cell in which each negative electrode active material of Example 1 and Comparative Examples 1 to 4 was used, charging/discharging characteristics were evaluated at the potential range of 0 to 2 V (the range containing the conversion reaction region) under the galvanostatic condition at the rate of 0.5 C. This evaluation is an evaluation of a half cell, but similar effects can also be expected in a total battery using a positive electrode.

Table 1 summarizes the early-stage discharge capacity per unit volume. Every negative electrode active material showed a significantly increased capacity compared with the discharge capacity of conventional graphite of 595 mAh/cc. Also, by comparing the half cell using the negative electrode active material of Example 1 and the half cell using that of Comparative Example 1, the increase of discharge capacity per unit volume has been accomplished by increasing the content of tin oxide in the negative electrode active material.

TABLE 1

|  | Discharge Capacity (mAh/cc) |
| --- | --- |
| Example 1 | 811 |
| Comparative Example 1 | 611 |
| Comparative Example 2 | 840 |
| Comparative Example 3 | 811 |
| Comparative Example 4 | 781 |

Figure 4:
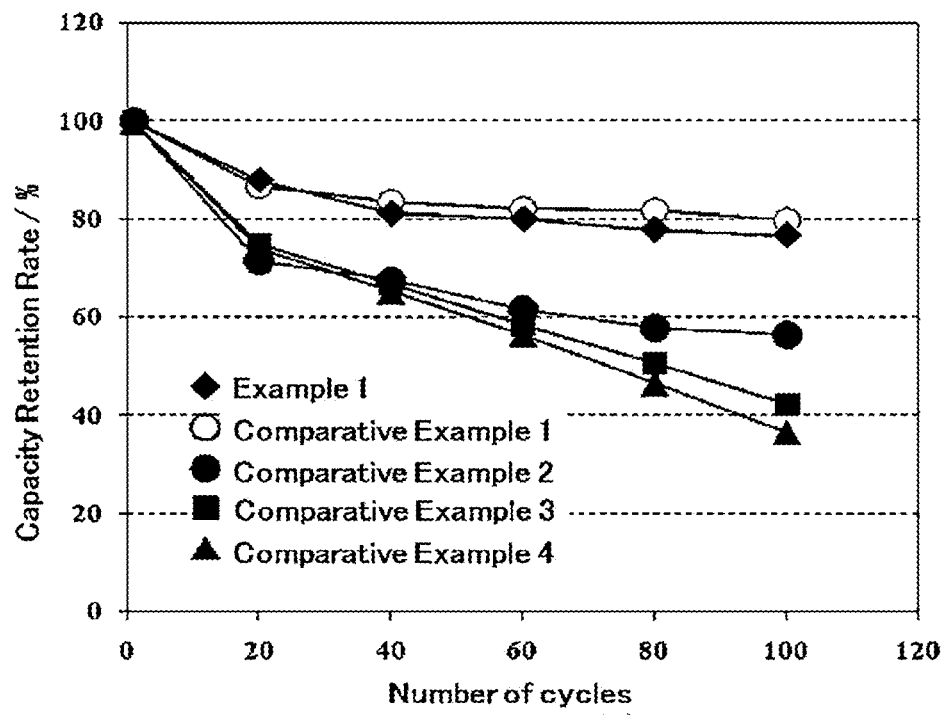
FIG. 4 shows the result of a charge-discharge cycle test of a negative electrode active material with an amorphous carbon film covering the surface of the tin oxide particle.

FIG. 4 shows the capacity retention rates. The half cell using the negative electrode active material of Example 1, as with the half cell using the negative electrode active material of Comparative Example 1 in which the spherical particle of tin oxide exists in the hollow of KETJEN BLACK, showed almost no decrease in discharge capacity after the discharge capacity became stable, and showed an excellent cycle performance. On the contrary, in the half cells using the negative electrode active materials of Comparative Examples 2, 3 and 4, the discharge capacity was reduced as charging/discharging was repeated. This phenomenon results from aggregation of the negative electrode active material induced by the tin oxide particle that contacts the outer surface of KETJEN BLACK. In the negative electrode active materials of Comparative Examples 3 and 4, since the mutual interaction between the polymer and the tin salt and/or the reaction product of sol-gel reaction of the tin salt does not exist or is extremely small, as with the negative electrode active material of Comparative Example 2, a coarse tin oxide particle was formed on the outer surface of KETJEN BLACK, and aggregation of the negative electrode active material was induced by this coarse tin oxide particle.

Therefore, the second negative electrode active material of the present invention is the negative electrode active material that has a high discharge capacity per unit volume and has excellent cycling characteristics.

(2) A Composite Containing a Low-Conductive Amorphous Carbon Layer Covering the Surface of Conductive Carbon Powder (Third Negative Electrode Active Material)

(a) Manufacture of the Negative Electrode Active Material

Example 2

In the inner cylinder of the reactor used in Example 1, a solution in which 5.64 g of SnCl$_2$.2H$_2$O and 0.56 g of polyvinyl alcohol were dissolved in 120 mL of water was introduced, and further, 3.2 mL of hydrochloric acid at the concentration of 2 M and 1.62 g of KETJEN BLACK (trade name: KETJEN BLACK EC600J, manufacturer: Ketjen Black International, initial particle diameter: 34 nm, pore size: 4 nm, specific surface area: 1520 m$^2$/g, amount of oxygen 6.1 mmol/g) were introduced, and the inner cylinder was rotated for 300 seconds so that centrifugal force of 70000 kgms$^{-2}$ was applied to the reaction solution, and SnCl$_2$.2H$_2$O, polyvinyl alcohol and KETJEN BLACK were made to be dispersed. The rotation of the inner cylinder was stopped, and 56.4 mL of NaOH aqueous solution at the concentration of 1 M was added to the inside of the inner cylinder and the inner cylinder was rotated for 300 seconds so that centrifugal force of 70000 kgms$^{-2}$ was applied to the reaction solution again. In the meantime, a thin film was composed on the inner wall of the outer cylinder, shearing stress and centrifugal force were applied to this thin film, and hydrolysis and polycondensation of SnCl$_2$ proceeded. After the rotation of the inner cylinder was stopped, KETJEN BLACK was filtered and retrieved, and was dried for 12 hours at 180 degrees centigrade within a vacuum. Then, the dried KETJEN BLACK, water and glutamic acid were mixed and kneaded at a mass ratio of 1:0.5:1, and a kneaded material was obtained. After water was evaporated from the kneaded material, polyvinyl alcohol and glutamic acid were pyrolyzed by heat-treating for 1 hour at 500° C. in nitrogen, and a negative electrode active material, in which the surface of tin oxide particle and the surface of KETJEN BLACK were covered with a thermolysis product of polyvinyl alcohol and a thermolysis product of glutamic acid (a low-conductive amorphous carbon film and a low-conductive amorphous carbon layer), respectively, was obtained.

When the negative electrode active material obtained was checked with X-ray powder diffraction, a slight amount of tin in addition to tin dioxide was found to have been formed. Diffraction peaks of the thermolysis products of polyvinyl alcohol and glutamic acid were not found, and a layer of amorphous carbon was formed. Moreover, TG-DTA evaluation was carried out under the condition of the temperature rising at a rate of 1 degree centigrade/minute in air atmosphere and the composition ratio of tin dioxide and carbon was calculated by considering the weight reduction amount at 200 degrees centigrade or more as the carbon amount, so that a value almost the same as the charge at the time of reaction (SnO$_2$: KETJEN BLACK=70:30 at a mass ratio) was obtained. Moreover, from a TEM photograph, a spherical particle of tin dioxide with a particle diameter 1 to 2 nm was supported by the internal surface and the outer surface of KETJEN BLACK, and 96% by mass of the initial particle existed in a non-aggregate state.

Example 3

The procedure of Example 2 was repeated except that aspartic acid was used in place of glutamic acid in the same amount as glutamic acid.

Example 4

The procedure of Example 2 was repeated except that aminopimelic acid was used in place of glutamic acid in the same amount as glutamic acid.

Example 5

The procedure of Example 2 was repeated except that homoserine was used in place of glutamic acid in the same amount as glutamic acid.

(b) Preparation of a Half Cell

A half cell was prepared in which a molding, which was obtained by adding to 0.7 mg of each negative electrode active material of Examples 1 to 5 the 30% by mass of the total of polyvinylidene fluoride and shaping the mixture, was used as a negative electrode, a 1 M $LiPF_6$ ethylene carbonate/diethylcarbonate 1:1 solution was used as an electrolytic solution, and lithium was used as a counter electrode.

(c) Charging/Discharging Characteristics

For the half cell in which each negative electrode active material of Examples 1 to 5 was used, charging/discharging characteristics were evaluated at the potential range of 0 to 2 V (the range containing the conversion reaction region) under the galvanostatic condition at the rate of 0.2 C (298 mA/g). This evaluation is an evaluation of a half cell, but similar effects can also be expected in a total battery using a positive electrode. Table 2 summarizes the irreversible capacity and reversible capacity at the first charging/discharging.

TABLE 2

|   | Irreversible Capacity A (mAhg−1) | Reversible Capacity B (mAhg−1) | A/B (%) |
|---|---|---|---|
| Example 1 | 1052 | 718 | 147 |
| Example 2 | 463 | 686 | 67 |
| Example 3 | 718 | 684 | 105 |
| Example 4 | 711 | 634 | 112 |
| Example 5 | 750 | 689 | 109 |

From Table 2 it is can be seen that all the negative electrode active materials have a significantly increased reversible capacity compared with the theoretical capacity of conventional graphite (372 mAh/g). From Table 2, it can be seen that the negative electrode active materials of Examples 2 to 5, that is, the negative electrode active materials with a low-conductive amorphous carbon layer covering the surface of KETJEN BLACK, compared with the negative electrode active material of Example 1, that is, the negative electrode active material that does not have a low-conductive amorphous carbon layer covering the surface of KETJEN BLACK and has the same amount of tin, had a slightly reduced reversible capacity and significantly reduced irreversible capacity. Therefore, it is found that the negative electrode active materials of Examples 2 to 5 have achieved inhibition of the reduction in reversible capacity and significant reduction of irreversible capacity.

(3) Negative Electrode Active Material Containing a Granulated Substance (First Negative Electrode Active Material)

(a) Manufacture of a Composite

Composite A:

In the inner cylinder of the reactor used in Example 1, a solution in which 5.64 g of $SnCl_2.2H_2O$, 0.435 g of $Fe(CH_3COO)_2$ and 0.56 g of polyvinyl alcohol were dissolved in 120 mL of water was introduced, and further, 3.2 mL of hydrochloric acid at the concentration of 2 M and 1.62 g of KETJEN BLACK (trade name: KETJEN BLACK EC600J, manufacturer: Ketjen Black International, initial particle diameter: 34 nm, pore size: 4 nm, specific surface area: 1520 $m^2/g$, amount of oxygen 6.1 mmol/g) were introduced, and the inner cylinder was rotated for 300 seconds so that centrifugal force of 70000 $kgms^{-2}$ was applied to the reaction solution, and $SnCl_2.2H_2O$, $Fe(CH_3COO)_2$, polyvinyl alcohol and KETJEN BLACK were made to be dispersed. The rotation of the inner cylinder was stopped, and 56.4 mL of NaOH aqueous solution at the concentration of 1 M was added to the inside of the inner cylinder and the inner cylinder was rotated for 300 seconds so that centrifugal force of 70000 $kgms^{-2}$ was applied to the reaction solution again. In the meantime, a thin film was composed on the inner wall of the outer cylinder, shearing stress and centrifugal force were applied to this thin film, and hydrolysis and polycondensation of $SnCl_2$ and $Fe(CH_3COO)_2$ proceeded. After the rotation of the inner cylinder was stopped, KETJEN BLACK was filtered and retrieved, and was dried for 12 hours at 180° C. within a vacuum. Then, the dried KETJEN BLACK, water and glucose were mixed and kneaded at a mass ratio of 1:0.5:1, and a kneaded material was obtained. After water was evaporated from the kneaded material, polyvinyl alcohol and glucose were pyrolyzed by heat-treating for 1 hour at 500 degrees centigrade in nitrogen, and Composite A, in which the surfaces of a tin oxide particle and KETJEN BLACK were covered with thermolysis products of polyvinyl alcohol and glucose, was obtained.

Composite B:

In the inner cylinder of the reactor used in Example 1, a solution in which 5.64 g of $SnCl_2.2H_2O$ and 0.435 g of $Fe(CH_3COO)_2$ were dissolved in 120 mL of water was introduced, and further, 3.2 mL of hydrochloric acid at the concentration of 2 M and 1.62 g of KETJEN BLACK (trade name: KETJEN BLACK EC600J, manufacturer: Ketjen Black International, initial particle diameter: 34 nm, pore size: 4 nm, specific surface area: 1520 $m^2/g$, amount of oxygen 6.1 mmol/g) were introduced, and the inner cylinder was rotated for 300 seconds so that centrifugal force of 70000 $kgms^{-2}$ was applied to the reaction solution, and $SnCl_2.2H_2O$, $Fe(CH_3COO)_2$ and KETJEN BLACK were made to be dispersed. The rotation of the inner cylinder was stopped, and 56.4 mL of NaOH aqueous solution at the concentration of 1 M was added to the inside of the inner cylinder and the inner cylinder was rotated for 300 seconds so that centrifugal force of 70000 $kgms^{-2}$ was applied to the reaction solution again. In the meantime, a thin film was composed on the inner wall of the outer cylinder, shearing stress and centrifugal force were applied to this thin film, and hydrolysis and polycondensation of $SnCl_2$ and $Fe(CH_3COO)_2$ proceeded. After the rotation of the inner cylinder was stopped, KETJEN BLACK was filtered and retrieved, and was dried for 12 hours at 180 degrees centigrade within a vacuum. Then, the dried KETJEN BLACK, water and glucose were mixed and kneaded at a mass ratio of 1:0.5:1, and a kneaded material was obtained. After water was evaporated from the kneaded material, glucose was pyrolyzed by heat-treating for 1 hour at 500 degrees centigrade in nitrogen, and Composite B, in which at least the surface of KETJEN BLACK was covered with a thermolysis product of glucose, was obtained.

Composite C:

The manufacturing process of Composite A was repeated except that glutamine acid was used in place of glucose in the same amount as glucose, and Composite C, in which the surfaces of a tin oxide particle and KETJEN BLACK were covered with thermolysis products of polyvinyl alcohol and glutamic acid, was obtained.

Composite D:

The manufacturing process of Composite B was repeated except that glutamine acid was used in place of glucose in the same amount as glucose, and Composite D, in which the surfaces of a tin oxide particle and KETJEN BLACK were covered with a thermolysis product of glutamic acid, was obtained.

(b) Manufacture of a Negative Electrode Active Material

Experiment 1: Granulated Substance with a Composite and Graphite: Pulverization by a Jet Mill By using a jet mill (device name JOM-mini, manufacturer: SEISHIN ENTERPRISE CO., Ltd), Composite A, graphite (trade name: J-CPB, manufacturer: Nippon Graphite Industries. Ltd, average particle diameter: 5 μm), or a mixture of these was pulverized, and a pulverized product was collected.

Experiment 2: Granulated Substance with a Composite and Graphite: Pulverization by a Jet Mill By using a jet mill (device name JOM-mini, manufacturer: SEISHIN ENTERPRISE CO., Ltd), Composite B, graphite (trade name: J-CPB, manufacturer: Nippon Graphite Industries. Ltd, average particle diameter: 5 μm), or a mixture of these was pulverized, and a pulverizated product was collected.

Experiment 3: Granulated Substance with a Composite and Graphite: Pulverization by a Raikai Mixer By using a raikai mixer, a mixture in which Composite A and graphite (trade name: J-CPB, manufacturer: Nippon Graphite Industries. Ltd, average particle diameter: 5 μm), was mixed at a mass ratio of 4:1 or 1:1 were pulverized, and a pulverized product was collected.

Experiment 4: Granulated Substance with a Composite and Nongraphitizable Carbon: Pulverization by a Jet Mill By using a jet mill (device name JOM-mini, manufacturer: SEISHIN ENTERPRISE CO., Ltd), Composite A, nongraphitizable carbon (pitch-based hard carbon, average particle diameter: 10 μm), or a mixture of these was pulverized, and a pulverized product was collected.

Experiment 5: Granulated Substance with a Composite and Graphite: Pulverization by a Jet Mill By using a jet mill (device name JOM-mini, manufacturer: SEISHIN ENTERPRISE CO., Ltd), Composite C, graphite (trade name: J-CPB, manufacturer: Nippon Graphite Industries. Ltd, average particle diameter: 5 μm), or a mixture of these was pulverized, and a pulverized product was collected.

Experiment 6: Granulated Substance with a Composite and Graphite: Pulverization by a Jet Mill By using a jet mill (device name JOM-mini, manufacturer: SEISHIN ENTERPRISE CO., Ltd), Composite D, graphite (trade name: J-CPB, manufacturer: Nippon Graphite Industries. Ltd, average particle diameter: 5 μm), or a mixture of these was pulverized, and a pulverized product was collected.

(c) Preparation of a Half Cell and Evaluation

A half cell was prepared in which a molding, which was obtained by adding to 0.7 mg of each pulverized product (negative electrode active material) obtained in Experiments 1 to 6 the 30% by mass of the total of polyvinylidene fluoride and shaping the mixture, was used as a negative electrode, a 1 M $LiPF_6$ ethylene carbonate/diethylcarbonate 1:1 solution was used as an electrolytic solution, and lithium was used as a counter electrode.

Figure 5:
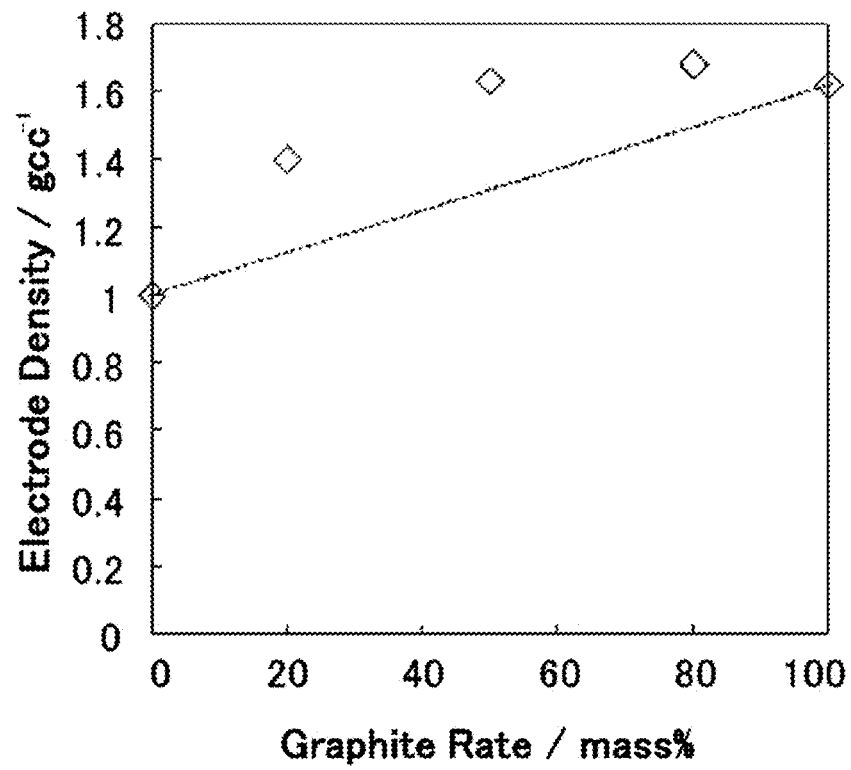
FIG. 5 shows the relationship between the density and the content of graphite of an electrode in which a granulated substance of a composite and graphite is used as a negative electrode active material.
Figure 6:
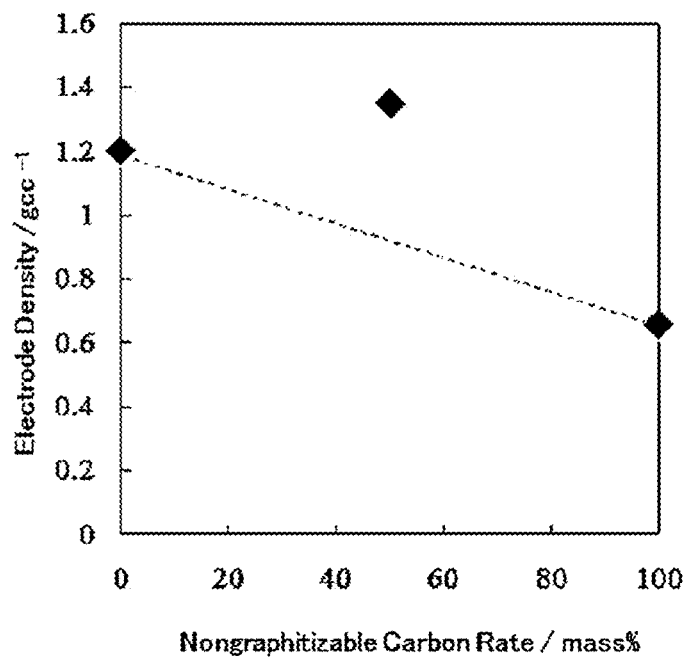
FIG. 6 shows the relationship between the density and the content of nongraphitizable carbon of an electrode in which a granulated substance of a composite and nongraphitizable carbon is used as a negative electrode active material.

For the negative electrode constituting the half cell, density was calculated by the weight and volume of the negative electrode active material, and was estimated as electrode density. FIG. 5 is an evaluation of the negative electrode active material obtained by the pulverization preparation of Experiment 1 and FIG. 6 is an evaluation of the negative electrode active material obtained by pulverization preparation of Experiment 4. The dotted lines in FIGS. 5 and 6 show the density X (g/cc) calculated by the following equation:

$$X(\text{g/cc}) = \{a \times (100-x) + b \times x\}/100$$

based on the density of the composite a(g/cc) and its ratio (100−x) (% by mass), density b of graphite or nongraphitizable carbon (g/cc) and its ratio (% by mass).

As can be seen from FIGS. 5 and 6, the negative electrode active material of the present invention shows density higher than the calculation value, and a dense granulated substance with a large bulk density was formed in the course of pulverization.

For the half cells using the pulverized product (negative electrode active material) obtained in Experiment 1 and Experiment 4, charging/discharging characteristics were evaluated at the potential range of 0 to 2 V (the range containing the conversion reaction region) under the galvanostatic condition at the rate of 0.2 C (298 mA/g). This evaluation is an evaluation of a half cell, but similar effects can also be expected in a total battery using a positive electrode.

Figure 7:
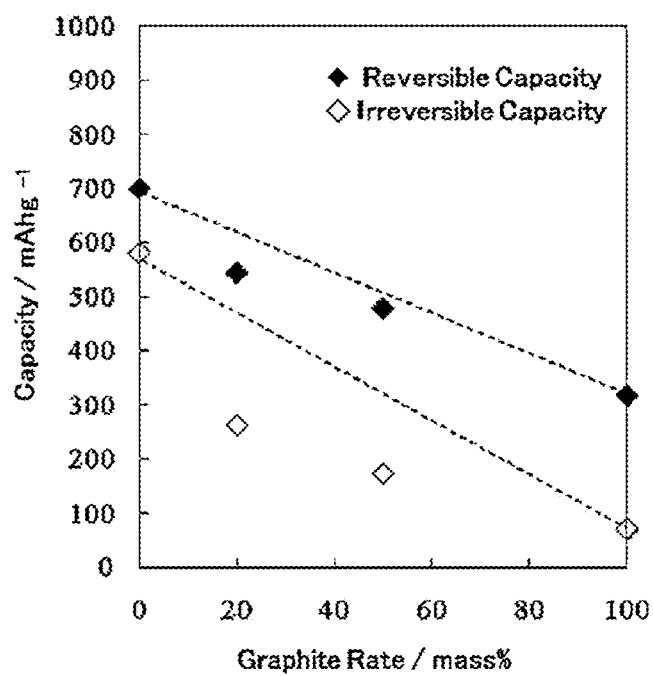
FIG. 7 shows the relationship between the capacity per unit mass and the content of graphite in the negative electrode active material shown in FIG. 5.
Figure 9:
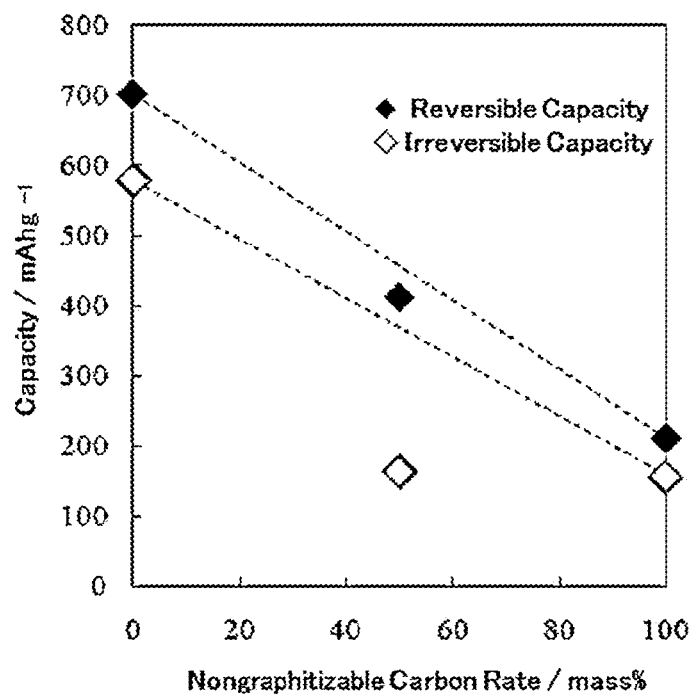
FIG. 9 shows the relationship between the capacity per unit mass and the content of nongraphitizable carbon in the negative electrode active material shown in FIG. 6.

FIG. 7 shows the irreversible capacity and the reversible capacity per unit mass at the first charging/discharging of the negative electrode active material containing the granulated substance of Composite A and graphite obtained in Experiment 1. FIG. 9 shows the irreversible capacity and the reversible capacity per unit mass at the first charging/discharging of the negative electrode active material containing the granulated substance of Composite A and nongraphitizable carbon obtained in Experiment 4. The dotted lines in FIGS. 7 and 9 show the calculated value of Y (mAh/g) which is calculated based on the capacity per weight c(mAh/g) of the composite, its ratio (100−x) (% by mass), the capacity d(mAh/g) of graphite or nongraphitizable carbon and its ratio x (% by mass) by the following equation:

$$Y(\text{mAh/g}) = \{c \times (100-x) + d \times x\}/100$$

As can be seen from FIG. 7 and FIG. 9, the reversible capacity of the negative electrode active material of the present invention containing the granulated substance of Composite A and the aggregate is almost the same as the calculated value, but it is found that the irreversible capacity is remarkably lower than the calculated value. In the half cell using the negative electrode active material of the present invention, it is considered that electrochemical decomposition of the electrolytic solution occurs on the outer surface of the granulated substance constituting the negative electrode active material, and SEI is formed on the outer surface of the granulated substance. It is considered that, since the solvent of the electrolytic solution cannot pass through SEI on the outer surface of this granulated substance, the contact area of the electrolytic solution and the carbon material can be decreased by granulation, and as a result, the initial irreversible capacity that probably results from the electrochemical decomposition of the electrolytic solution on the surface of the carbon material is remarkably reduced. Besides, since the reversible capacity of the negative electrode active material of the present invention almost coincides with the calculated value, it was judged that the structure of Composite A is stably maintained without being affected by pulverization, and the reversibility of the conversion reaction is maintained.

Figure 8:
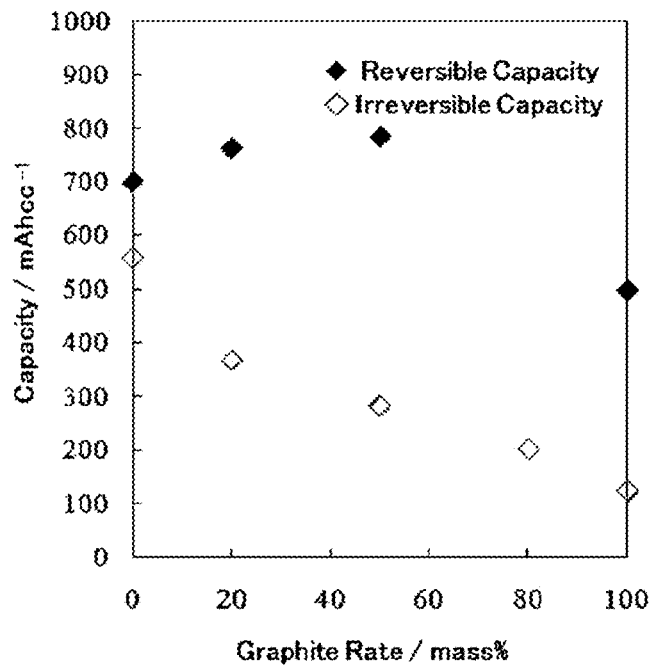
FIG. 8 shows the relationship between the capacity per volume and the content of graphite in the negative electrode active material shown in FIG. 5.
Figure 10:
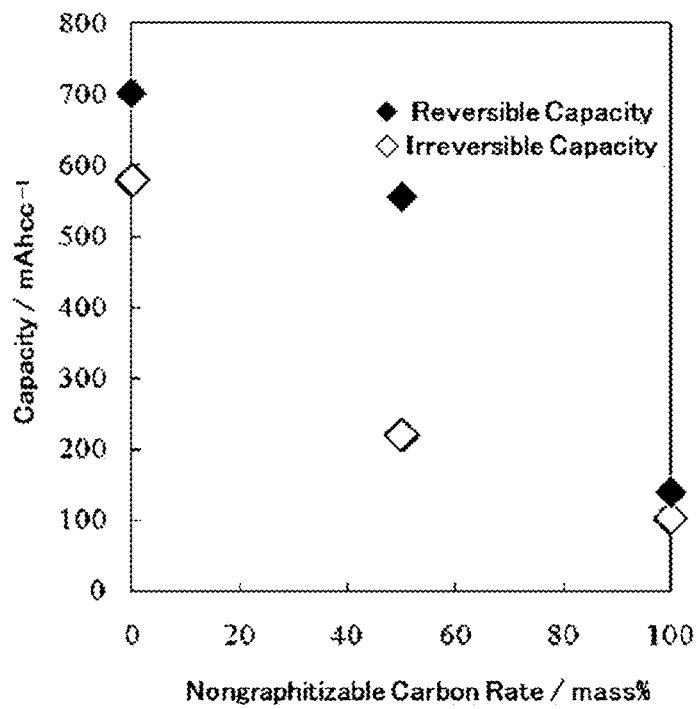
FIG. 10 shows the relationship between the capacity per volume and the content of nongraphitizable carbon in the negative electrode active material shown in FIG. 6.

FIG. 8 shows the irreversible capacity and the reversible capacity per unit volume of the negative electrode active material including the granulated substance of Composite A and graphite obtained in Experiment 1, calculated using the measurement result of FIG. 7 and the measurement result of the electrode density in FIG. 5, while FIG. 10 shows the irreversible capacity and the reversible capacity per unit volume of the negative electrode active material containing the granulated substance of Composite A and nongraphitizable carbon obtained in Experiment 4, calculated using the measurement result of FIG. 9 and the measurement result of the electrode density of FIG. 6. From FIG. 8, it can be seen that, though the reversible capacity per unit volume of the negative electrode active material consisting of graphite alone is lower than the reversible capacity per unit volume of the negative electrode active material consisting of Composite A alone, in an area where the rate of graphite in the granulated substance is about 80% by mass or less of the total, the value of the reversible capacity per unit volume of the negative electrode active material containing the granulated substance of Composite A and graphite is larger than the value of the reversible capacity per unit volume of the negative electrode active material consisting of Composite A alone. This result reflects a fact that a dense granulated substance with high bulk density was obtained by pulverization. In FIG. 10, which shows the result concerning the negative electrode active material in which nongraphitizable carbon was used as the aggregate, the value of the reversible capacity per unit volume of the negative electrode active material containing the granulated substance of Composite A and nongraphitizable carbon is smaller than the value of the reversible capacity of the negative electrode active material consisting of Composite A alone. The difference between the results of FIG. 8 and FIG. 10 reflects a fact that graphite has a large reversible capacity and large bulk density compared with nongraphitizable carbon. However, it is found that, also in the negative electrode active material in which nongraphitizable carbon was used as the aggregate, the decreasing rate of the reversible capacity is small in the area where the rate of nongraphitizable carbon was about 50% by mass or less of the total.

Figure 11:
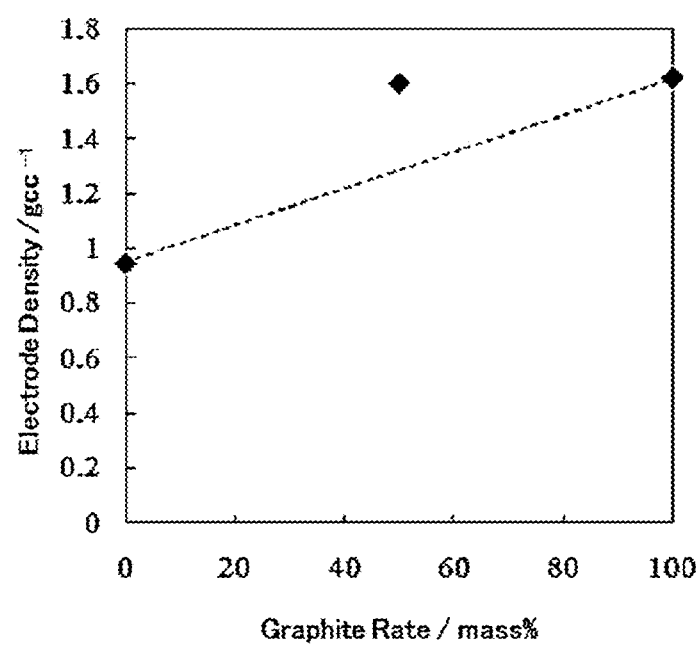
FIG. 11 shows the relationship between the density and the content of graphite of an electrode in which a granulated substance of another composite and graphite is used as a negative electrode active material.
Figure 12:
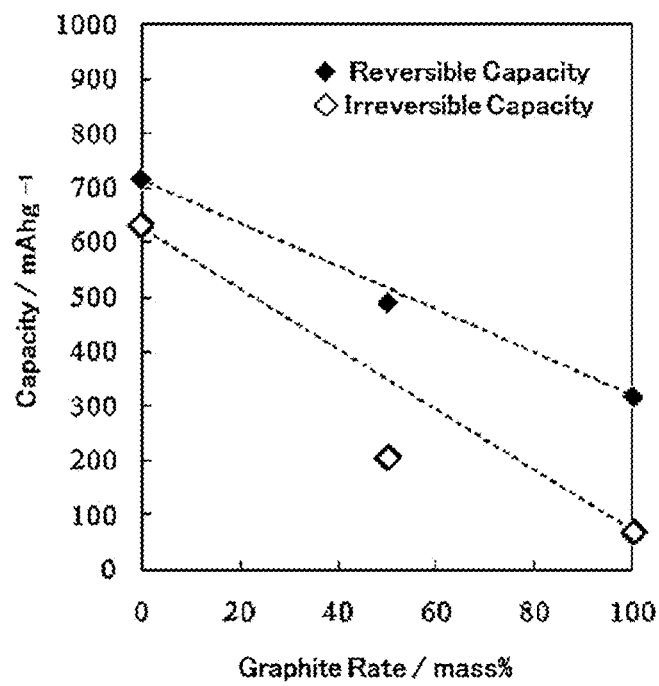
FIG. 12 shows the relationship between the capacity per unit mass and the content of graphite in the negative electrode active material shown in FIG. 11.
Figure 13:
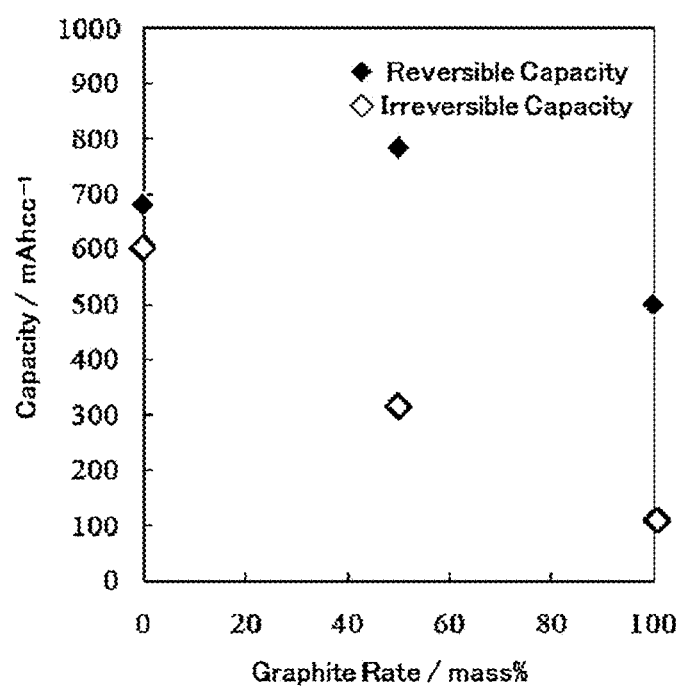
FIG. 13 shows the relationship between the capacity per unit volume and the content of graphite in the negative electrode active material shown in FIG. 11.

FIGS. 11, 12 and 13 are figures corresponding to FIGS. 5, 7 and 8 concerning the pulverized product (negative electrode active material) of Experiment 2 using Composite B in the place of Composite A. When Composite B was used, almost the same result as when Composite A was used was obtained.

Figure 14:
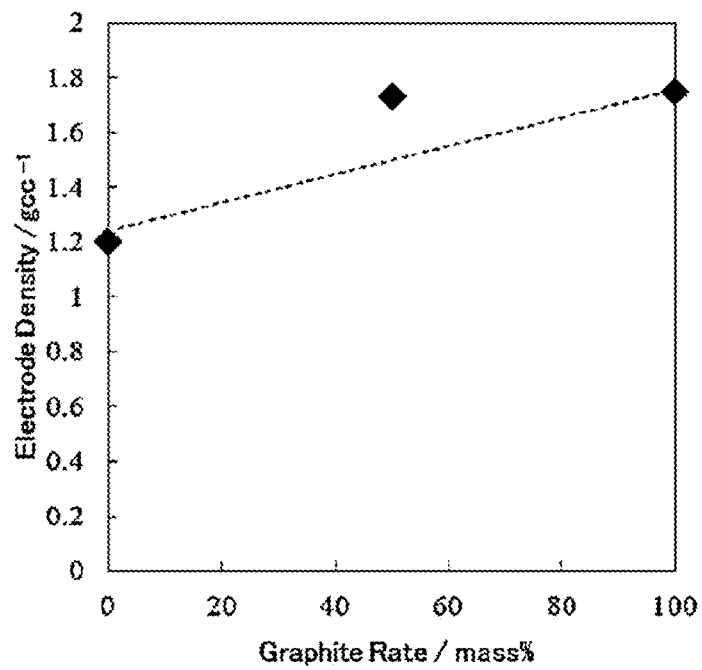
FIG. 14 shows the relationship between the density and the content of graphite of an electrode in which a granulated substance of yet another composite and graphite is used as a negative electrode active material.
Figure 15:
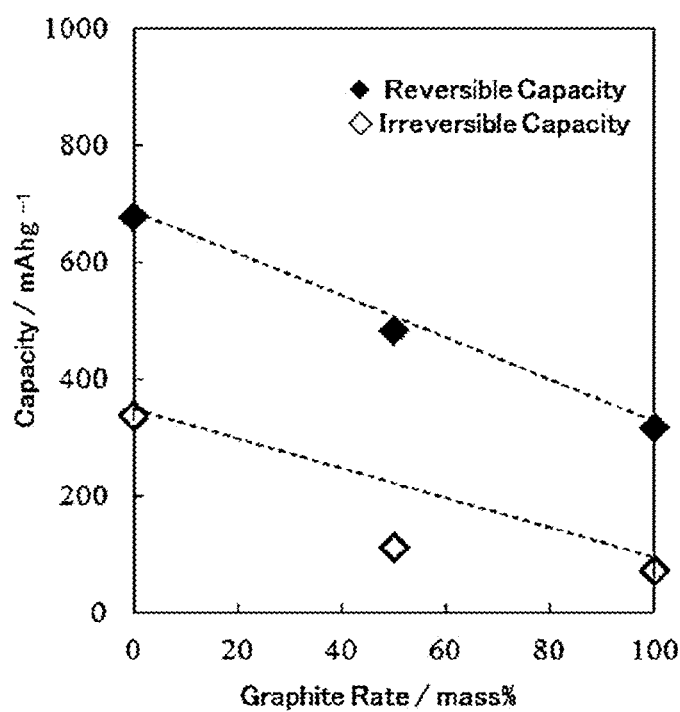
FIG. 15 shows the relationship between the capacity per unit mass and the content of graphite in the negative electrode active material shown in FIG. 14.
Figure 16:
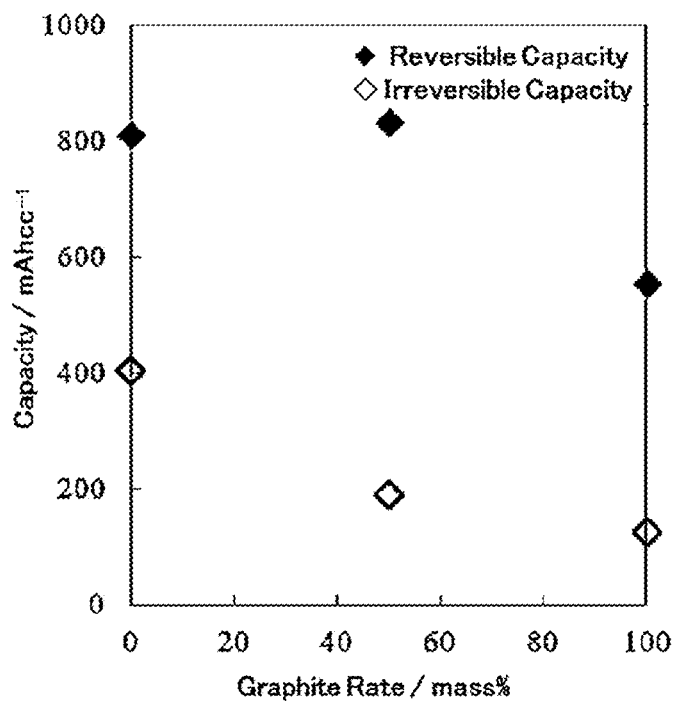
FIG. 16 shows the relationship between the capacity per unit volume and the content of graphite in the negative electrode active material shown in FIG. 14.
Figure 17:
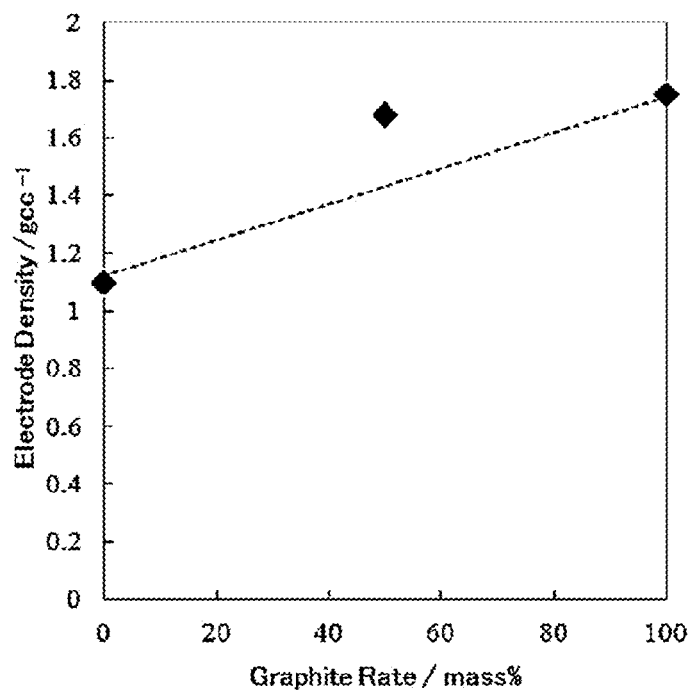
FIG. 17 shows the relationship between the density and the content of graphite of an electrode in which a granulated substance of yet another composite and graphite is used as a negative electrode active material.
Figure 18:
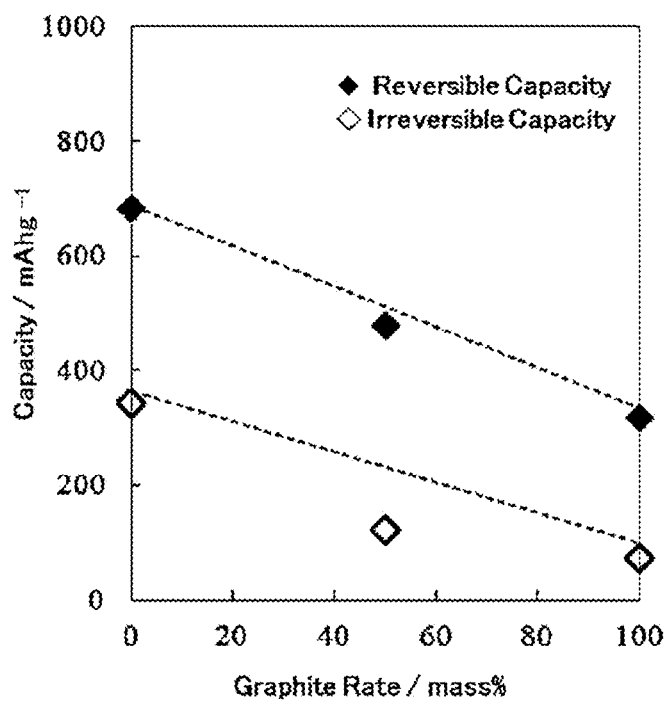
FIG. 18 shows the relationship between the capacity per unit mass and the content of graphite in the negative electrode active material shown in FIG. 17.
Figure 19:
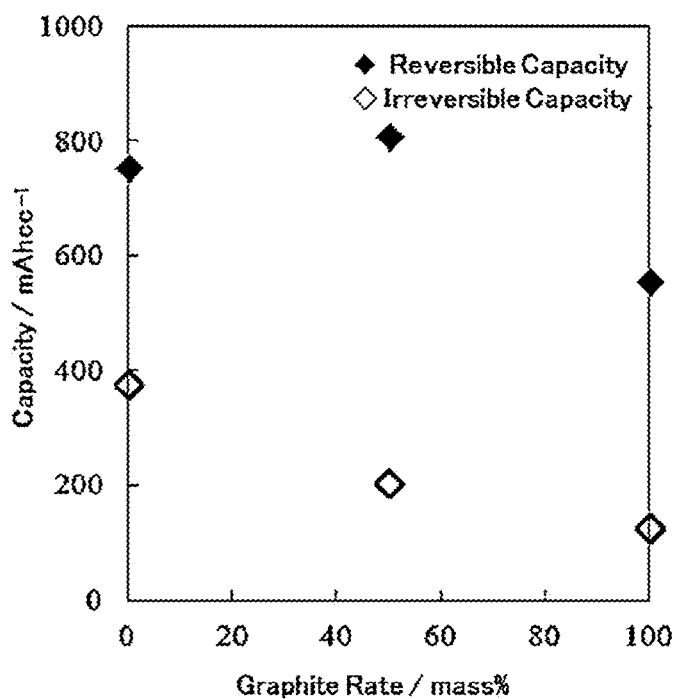
FIG. 19 shows the relationship between the capacity per unit volume and the content of graphite in the negative electrode active material shown in FIG. 17.

FIGS. 14, 15 and 16 are figures corresponding to FIGS. 5, 7, and 8 concerning the pulverized product (negative electrode active material) in Experiment 5 using Composite C, and FIGS. 17, 18 and 19 are figures corresponding to FIGS. 5, 7, and 8 concerning the pulverized product (negative electrode active material) in Experiment 6 using Composite D, respectively. From FIGS. 15 and 18, it is found that the reversible capacity per unit mass of the negative electrode active material containing the granulated substance, in which Composite C or Composite D and graphite are aggregated, is almost the same as the calculated value, but that the irreversible capacity is remarkably lower than the calculated value. The amorphous carbon layer in Composite A and Composite B covering at least the surface of the conductive carbon powder derives from glucose, but the amorphous carbon layer in Composite C and Composite D covering at least the surface of the conductive carbon powder derives from glutamic acid. Because the amorphous carbon layer derived from glutamic acid is dense compared with the amorphous carbon layer from glucose and it covers the active sites of the conductive carbon effectively, as can be seen from the comparison of FIG. 7, FIG. 12, FIG. 15 and FIG. 18, the irreversible capacity of Composite C or Composite D alone (0% by mass of graphite) is significantly lowered compared with the irreversible capacity of Composite A or Composite B alone. Therefore, in order to lower the irreversible capacity in the negative electrode active material of the present invention containing the granulated substance in which a composite and graphite are aggregated, Composite C or Composite D containing the amorphous carbon layer derived from glutamic acid is more preferable than Composite A or Composite B containing an amorphous carbon layer derived from glucose. Moreover, as can be seen from FIG. 16 and FIG. 19, though the reversible capacity per unit volume of the negative electrode active material consisting of graphite alone is lower than the reversible capacity per unit volume of the negative electrode active material consisting of Composite C or Composite D alone, in an area where the rate of graphite in the granulated substance is about 50% by mass or less of the total, the value of the reversible capacity per unit volume of the negative electrode active material containing the granulated substance of Composite C or Composite D and graphite is equivalent to the value of the reversible capacity of the negative electrode active material consisting of Composite C or Composite D alone. This result reflects a fact that a dense granulated substance with high bulk density was obtained by pulverization.

Figure 20:
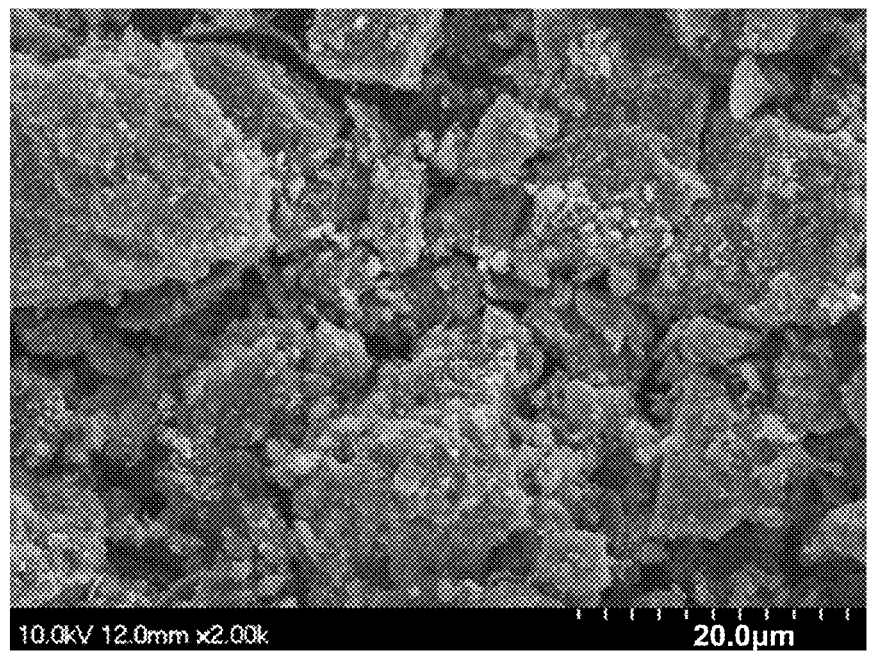
FIG. 20 shows a SEM photograph of a granulated substance of a composite and graphite; (A) is a photograph of a granulated substance obtained by using a raikai mixer and (B) is a photograph of a granulated substance obtained by using a jet mill.
Figure 20:
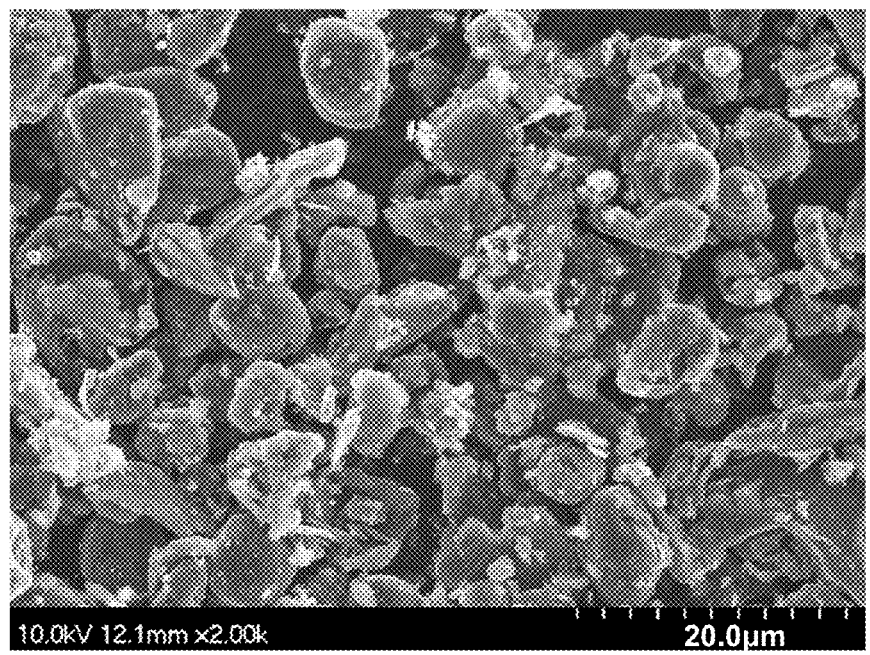

FIG. 20(A) is a SEM photograph of the granulated substance obtained by pulverizing the mixture of Composite A: graphite=1:1 by a raikai mixer, and FIG. 20(B) is a SEM photograph of the granulated substance obtained by pulverizing the mixture of Composite A: graphite=1:1 by a jet mill. The granulated substance obtained by using a jet mill, compared with the granulated substance obtained by a raikai mixer, has a smaller particle diameter of the aggregate, and the abundance of fine grains attached to the surface of coarse grains is low. It is considered that, since the pulverization efficiency of the jet mill is high, the aggregate was likely to be miniaturized, and the grains of the aggregate pulverized comparatively finely aggregated while effectively capturing fine grains produced by pulverization and Composite A, so that spheroidization proceeded, and a more dense granulated substance with high bulk density was formed.

Figure 21:
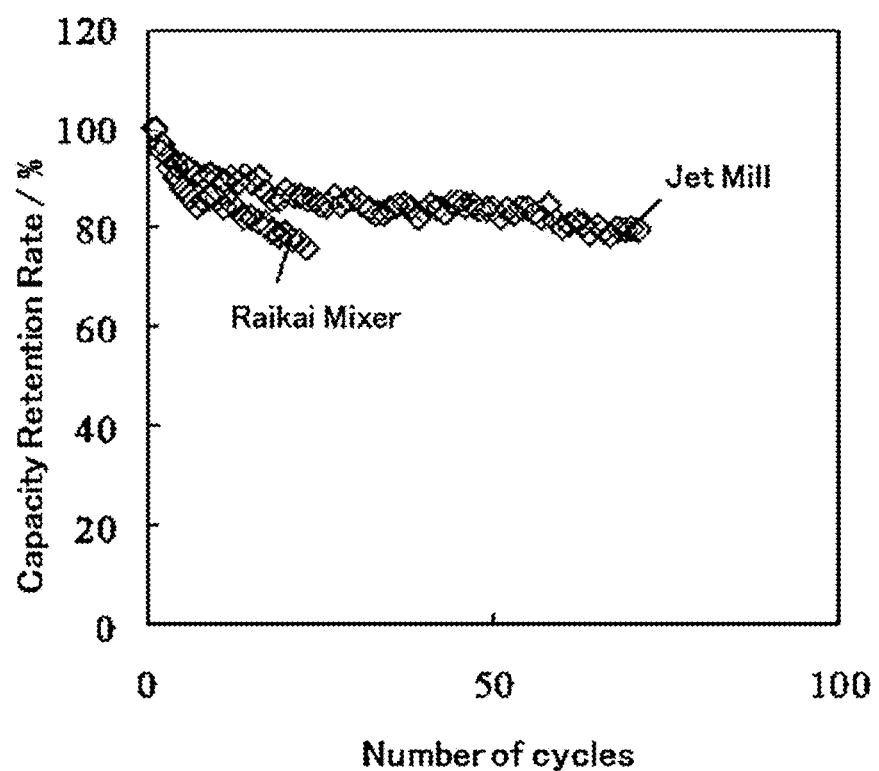
FIG. 21 shows the result of the charge-discharge cycle test.

FIG. 21 shows the result of a charge-discharge cycle test of a half cell using the negative electrode active material containing the granulated substance obtained by pulverizing the mixture of Composite A: graphite=4:1 with a raikai mixer and of a half cell using the negative electrode active material containing the granulated substance obtained by pulverizing the mixture of Composite A: graphite=4:1 with a jet mill, within the potential range of 0 to 2 V (the range containing the conversion reaction region) under the galvanostatic condition at the rate of 0.5 C. The half cell which used the granulated substance pulverized by a jet mill as a negative electrode active material showed stable cycling characteristics. This is considered to reflect a fact that the granulated substance with a stable structure was obtained because the pulverization efficiency of the jet mill is high.

INDUSTRIAL APPLICABILITY

The negative electrode active material of the present invention is promising as a negative electrode active material in the place of graphite because it has a reduced initial irreversible capacity and a high reversible capacity, can be suitably used as a next-generation lithium ion secondary battery, and is also suitable as a negative electrode active material for a hybrid capacitor.

What is claimed is:

1. A negative electrode active material capable of reversibly occluding and releasing lithium according to a conversion reaction of an equation (I) and an alloying reaction of an equation (II), $$SnO_2 + 4Li^+ + 4e^- \rightleftharpoons 2Li_2O + Sn \qquad (I)$$

$$Sn + 4.4Li^+ + 4.4e^- \rightleftharpoons Li_{4.4}Sn \qquad (II)$$

in which nanosize conductive carbon powder and a nanosize tin oxide spherical particle contacting a surface of the conductive carbon powder are comprised in a highly dispersed state such that 30% by mass or more of primary particles of the conductive carbon powder are not aggregated and 30% by mass or more of primary particles of the tin oxide spherical particles are not aggregated, and a low-conductive amorphous carbon film with 1/100 or less of an electric conductivity of the conductive carbon powder covering an area which is included in a surface of the tin oxide spherical particle and which does not contact the surface of the conductive carbon powder is further comprised, the nanosize conductive carbon powder has an inner vacancy and the surface composed of an outer surface and an inner surface, and the tin oxide spherical particle has an average particle diameter of 1 to 2 nm and exists in the inner vacancy and on the outer surface of the conductive carbon powder.

2. A lithium ion secondary battery comprising:
a negative electrode comprising the negative electrode active material according to claim 1;

a positive electrode containing a positive electrode active material capable of occluding and releasing lithium; and a separator retaining a nonaqueous electrolytic solution placed between the negative electrode and the positive electrode.

3. A method for producing a negative electrode active material according to claim 1, comprising:

an introduction step of introducing, into a rotatable reactor, a reaction solution prepared by adding the nanosize conductive carbon powder having the inner vacancy to a solution in which a tin oxide precursor and polyvinyl alcohol are dissolved;

a reaction step of rotating the reactor so as to obtain a nanosize reaction product with a spherical shape by inducing a hydrolysis reaction and a polycondensation reaction of the tin oxide precursor while adding shearing stress and centrifugal force on the reaction solution, and simultaneously support the reaction product in the inner vacancy and on the outer surface of the conductive carbon powder and also attach the polyvinyl alcohol to a surface of the reaction product; and a heat treatment step of drying a product obtained by the reaction step and pyrolyzing the polyvinyl alcohol to form the low-conductive amorphous carbon film on the surface of the nanosize tin oxide spherical particle.

4. The method for producing a negative electrode active material according to claim 3, wherein the conductive carbon powder has a hollow-shell structure and an open pore to connect an inner surface and an outer surface of the shell, and the mass of the tin oxide precursor in the reaction solution is within the range of 1.5 to 4 times the mass of the conductive carbon powder in terms of tin dioxide.

* * * * *